Feb. 11, 1964 J. E. WOLFE ETAL 3,121,216

QUICK ACCESS REFERENCE DATA FILE

Filed June 25, 1959 9 Sheets-Sheet 1

Inventors
John E. Wolfe
William C. Hughes
Richard J. Rieke
Howard L. Lester
by Charles W. Helzer
Their Attorney Inventors
John E. Wolfe
William C. Hughes
Richard J. Rieke
Howard L. Lester
by Charles W. Helzer
Their Attorney Feb. 11, 1964 J. E. WOLFE ETAL 3,121,216

QUICK ACCESS REFERENCE DATA FILE

Filed June 25, 1959 9 Sheets-Sheet 3

Inventors
John E. Wolfe
William C. Hughes
Richard J. Rieke
Howard L. Lester
by Charles W. Helzer
Their Attorney

QUICK ACCESS REFERENCE DATA FILE

Filed June 25, 1959

Inventors
John E. Wolfe
William C. Hughes
Richard J. Rieke
Howard L. Lester
by Charles W. Helzer
Their Attorney

QUICK ACCESS REFERENCE DATA FILE

Filed June 25, 1959 9 Sheets-Sheet 5

Inventors
John E. Wolfe
William C. Hughes
Richard J. Rieke
Howard L. Lester
by Charles W Helzer
Their Attorney Inventors
John E. Wolfe
William C. Hughes
Richard J. Rieke
Howard L. Lester
by Charles W. Helzer
Their Attorney Inventors
John E. Wolfe
William C. Hughes
Richard J. Rieke
Howard L. Lester
by Charles W. Helzer
Their Attorney Inventors
John E. Wolfe
William C. Hughes
Richard J. Rieke
Howard L. Lester
by Charles W. Helzer
Their Attorney

QUICK ACCESS REFERENCE DATA FILE

Filed June 25, 1959

9 Sheets-Sheet 9

Inventors
John E. Wolfe
William C. Hughes
Richard J. Rieke
Howard L. Lester
by Charles W. Helzer
Their Attorney United States Patent Office 3,121,216
Patented Feb. 11, 1964

3,121,216
QUICK ACCESS REFERENCE DATA FILE

John E. Wolfe and William C. Hughes, Schenectady, Richard J. Rieke, Scotia, and Howard L. Lester, Alplaus, N.Y., assignors to General Electric Company, a corporation of New York Filed June 25, 1959, Ser. No. 822,931
24 Claims. (Cl. 340—173)

The present invention relates to a quick access, high density data storage device.

More particularly, the invention relates to a data storage device capable of storing close to a billion bits of information and having an access time in the order of one millisecond.

With present day electronic computers being used in ever increasing numbers for solving a variety of different problems in both business and the military, the need has arisen for a reliable data storage device having a comparatively large memory which is capable of supplying desired data within a relatively short time period after requesting the device for the data. In particular, there is a pronounced need for a data storage device capable of storing on the order of a billion bits of information and having an access time on the order of one millisecond. In addition to these requisites, it is also essential that the data storage device be highly reliable in operation.

It is, therefore, a primary object of the invention to provide a quick access, high density data storage device which is highly reliable in operation.

Another object of the invention is to provide a data storage device having the above characteristics which has an excellent signal to noise ratio in that it uses light optical gratings of two different colors to store data in binary form.

In practicing the invention, a quick access data storage device is provided which includes a solid impressionable medium having intelligence conveying light modifying marks formed thereon preferably by electron beam writing. The solid impressionable medium is disposed within the view of a rapid scanning light source, such as a flying spot scanner tube for producing a scanning beam of light. It is desired that the scanning beam light be capable of rapidly scanning across the entire width and height of the solid impressionable medium to illuminate any desired light modifying mark on the medium. To complete the device, photoelectric means are positioned to view the medium and to have the light emanating from illuminated portions of the medium fall on the photoelectric means for deriving an output electric signal representative of the intelligence stored in the marks on the medium.

Other objects, features, and many of the attendant advantages of this invention will be appreciated more readily as the same become better understood by reference to the following detailed description when considered in connection with the accompanying drawings wherein like parts in each of the several figures are identified by the same reference character, and wherein.

Figures 12, 13:
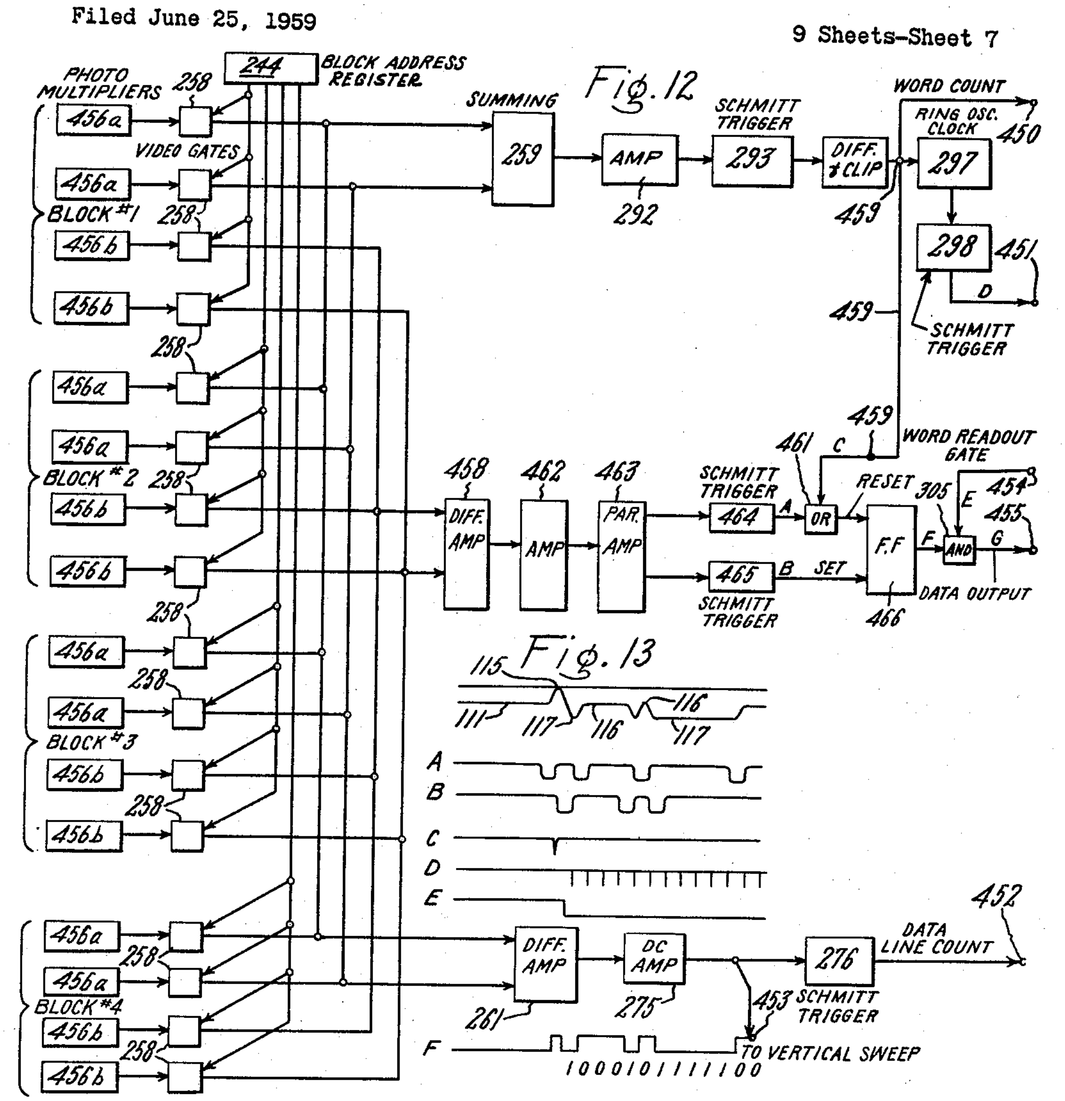
FIG. 12 is a functional block diagram of the circuitry employed with the alternative read-out arrangement of FIG. 11.
FIG. 13 is a series of graphs illustrating the wave form of the potentials derived in the circuitry of FIG. 12.
Figure 17:
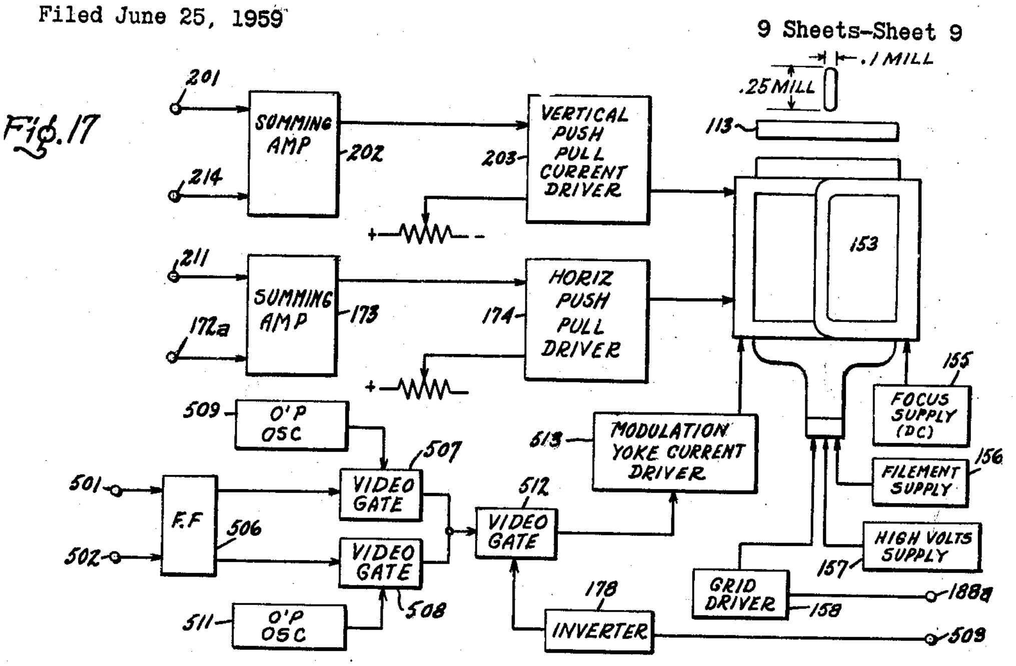
FIG. 17 is a functional block diagram of an alternate writing arrangement used for writing data on the solid impressionable thermoplastic storage plate, which is capable of writing information in the form of two different color gratings with one color grating representing a zero, and the other color grating representing a one for recording binary data.
Figures 18, 19:
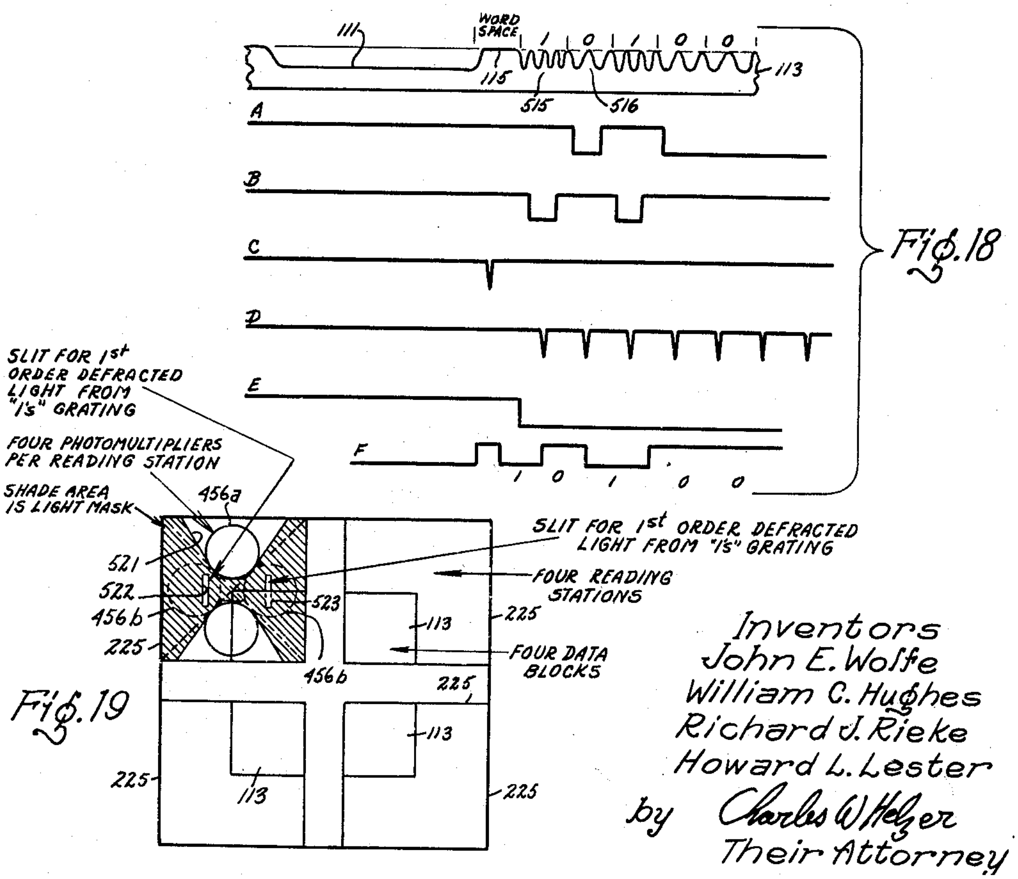

FIG. 18 is a series of graphs representing the wave shape of the potentials derived from a reading circuit used in reading out the information recorded by the data writing system of FIG. 17; and FIG. 19 is the front view of a photoelectric device read-out arrangement employed in reading out data recorded by the writing scheme of FIG. 17, and is to be employed with an over-all read-out system such as is illustrated in FIG. 12.

*Quick Access Data Storage Device*

Figure 1:
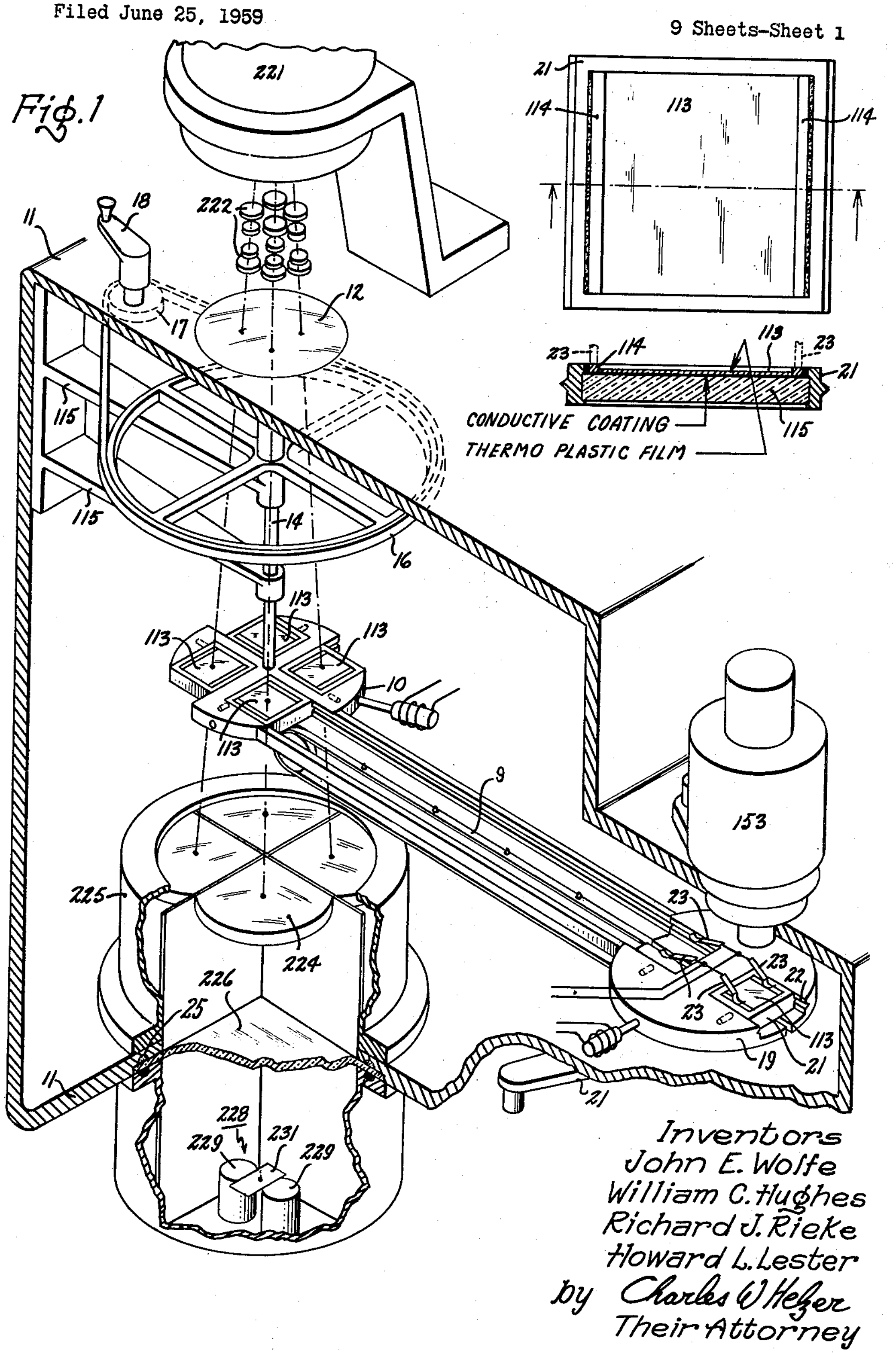
FIG. 1 is a perspective view of a partially disassembled quick access data storage device constructed in accordance with the teachings of the present invention.

The new and improved quick access, high density data storage device is illustrated in FIG. 1 of the drawings, and includes an electron beam writing apparatus 153 positioned to direct a fine beam of electrons down upon a data storage plate 113 having a solid impressionable thermoplastic medium surface for the purpose of writing data on such surface as will be explained more fully hereinafter. Upon completion of the writing of the data on the data storage plates 113 they are transferred by a suitable transfer mechanism, indicated broadly at 9, to a read-out position shown at 10. When supported in the read-out position 10, the data storage plates 113 are illuminated by a scanning beam of light directed thereagainst from a light source comprised by a flying spot scanner tube 221. The flying spot scanner tube 221 is supported on a housing 11 over a window 12 formed in the housing for allowing a beam of light to be directed therethrough. In order to properly image a beam of light from the flying spot scanner tube 221 onto a predetermined part of the thermoplastic film data storage plates 113, four process lens assemblies 222 of conventional construction are supported intermediate the flying spot scanner tube 221 and the window 12 in the housing 11. Housing 11 comprises an evacuated chamber which may be evacuated through an opening not shown by any conventional vacuum techniques. By this arrangement, the scanning beam of light produced by the flying spot scanner 221 is caused to scan all four plates simultaneously. The thermoplastic film data storage plates 113 are supported in a plate holding structure 10 with one of the data storage plates 113 held in each quadrant of the holding structure.

The plate holding structure 10 is secured to a shaft 14 which is journaled in a supporting arm 15 secured to the inside of the vacuum type housing 11 with the shaft 14 being keyed to a pulley wheel 16. Pulley wheel 16 has a pulley belt disposed thereover which runs around a drive wheel 17 that is keyed to a shaft that is journaled in the housing 11 and keyed to a handle 18 on the outside of the housing. By this arrangement, the plate holding structure 10 can be rotated to present any one of the plates 113 in confronting relation to the transfer mechanism 9, and when positioned is rigidly locked in place by a solenoid operated detent 20 which coacts with openings in the side of the holding structure 10. The plates 113 are rigidly held in position in the holder 10 by small spring biased detents (not shown) which can be overcome by the transfer mechanism 9. The transfer mechanism 9 may comprise any means such as a cogged pulley belt having cogs for engaging a protruding edge of the thermoplastic film data storage plates 113 when they are either in the plate holding structure 10 or its corresponding part 19 disposed under the electron beam writing apparatus 153 and for transferring the plate to the opposite plate holding structure. The plate holding structure 19 is keyed to a shaft which is journaled in the vacuum tight housing 11 and may be rotated by handle 21 to present either one of two opposing slots indicated at 22 to the transfer mechanism 9.

By this arrangement, there is always a spare thermoplastic film data storage plate 113 disposed under the electron beam writing tube 153 for writing data thereon while the four working thermoplastic film data storage plates 113, supported in the plate holding structure 10, are being used by the data read-out means of the storage device. Should it be desired to correct data in any one of the four thermoplastic film data storage plates 113, or to substitute a new plate of data in its stead, the new block of data with the corrections on the block of data to be substituted is written on the blank plate 113 located under the writing gun 153 in slot 22. It is, of course, possible to copy portions of the data from a plate 113 located in holding structure 10 at the same time that the writing is taking place, new data being inserted where changes are required, or to write on new data from some suitable external data source. Holding structure 10 can then be rotated by rotating handle 18 outside the housing 11 so as to position the plate 113 which contains the block of data which has been modified into position in front of the transfer mechanism 9. The plate 113 can then be transferred by transfer mechanism 9 into the empty slot into holding structure 19. Holding structure 19 is now rotated by rotating handle 21 outside the vacuum housing 11 to bring the freshly prepared plate located in slot 22 into position in front of the transfer mechanism 9. The freshly prepared plate 113 can then be transferred by transfer mechanism 9 into the position previously vacated in holding structure 10.

It will, of course, be necessary to rotate the writing tube 153 by means of handle 26 so that the data will be written on the blank plate 113 located in slot 22 so that the lines of data will have the correct orientation with respect to holding structure 10 when this plate 113 is inserted into holding structure 10.

A cross-sectional view of one of the thermoplastic film data storage plates 113 is shown immediately above the electron beam writing apparatus 153. The plate is comprised by a thin solid impressionable thermoplastic film medium 113 secured over a transparent conductive layer 114 which is supported on a transparent base plate 115. The base plate 115 must be optically clear and smooth and nonplastic at temperatures up to around 150° C. The thickness of this base plate is not critical, and one suitable material for the base plate is an optical grade of glass. This base plate supports the transparent conductive coating 114 which is, of course, adherent to the base plate 115 and covers its entire surface, but is insulated from the metal guide structure 21. The thermoplastic film 113 is then adhered to the transparent conductive surface 114, and also must be optically clear in addition to having a resistance to irradiation, a substantially infinite room viscosity, and a relatively fluid viscosity at temperatures of 100°–150° C. with high resistivity.

One satisfactory thermoplastic material for this purpose is a blend of polystyrene, m-terephenyl, and a copolymer of 95 weight percent of butadiene and five weight percent styrene. Specifically, the composition may be 70% polystyrene, 28% m-terephenyl, and 2% of the copolymer. The film 113 can be prepared by forming a 10% solid solution of the blend in toluene and coating the base material with this solution. The toluene is then evaporated by air drying and by pumping in a vacuum to produce the final composite article. The film thickness of the thermoplastic films can vary from about .01 mil to several mils, with the preferred thickness being about equal to the distance between the depressions in the film which will be described hereinafter.

The base plate 115 is supported in a rectangular shaped frame 21 with a space being provided between the edges of the frame 21 and the impressionable thermoplastic film medium 113 so that the contacts 23 can make positive electrical contact through to transparent conductive film 113. The relation of the film to these parts is also depicted in the plan view of the storage plate illustrated just above the cross-sectional view in the right hand corner of the drawing. Data may be written on the surface of the thermoplastic film impressionable medium 113 by a scanning electron beam from electron beam writing tube 153 in patterns which can be modified to record intelligence. Prior to writing, it may be desirable to heat the film 113 in the below described manner to render the film slightly viscous to allow it to easily capture the electrons. Subsequent to writing the electron patterns on the surface of the thermoplastic film 113, electric current is passed through the electrical contacts 23 of sufficient magnitude to heat the transparent conductive film 114 to a temperature in the neighborhood of 100° C. to cause the thermoplastic film 113 to become viscous. Upon reaching this condition, the electrons will form permanent depressions in a desired pattern in the thermoplastic film surface which, upon cooling, form a permanent record of the pattern written by the electron beam writing apparatus. Plastic film 113, which has been previously recorded upon, is heated in the same manner prior to writing to allow the previously recorded depressions to be smoothed out through the action of surface tension. The manner in which the intelligence written in the pattern in this fashion can be read out from the thermoplastic film data storage plate 113 will be described more fully hereinafter in connection with the construction of the read-out means.

The read-out means of the new improved data storage device includes a plurality of photoelectric devices 229 supported within a light-tight container 225 that is secured to the housing 11 in vacuum-tight relationship by a suitable sealing ring arrangement shown at 25. For this purpose, the light-tight housing 225 is fabricated from two parts separated by a vacuum-tight window 226 for preserving the vacuum within the interior of the housing 11. In reading out data stored on any of the thermoplastic film impressionable medium data storage plates 113, the scanning light beam produced by the flying spot scanner tube 221 is directed to all of the plates 113 so that the light beam passes through a selected spot on each to illuminate light modifying marks previously formed on a thermoplastic film storage plate 113 by the electron beam writing apparatus 153. This light modifying mark will then modify the character of the scanning light beam either by decreasing its amplitude or refracting the light beam, and the modified light beam passes through the field lens assembly 224 and the transparent window 226, where it either impinges upon the photoelectric devices 229, or an opaque absorbent material 231, depending upon the nature of the mark in the thermoplastic film impressionable medium data storage plate 113 as will be described hereinafter in connection with the succeeding drawings of the invention. It will be recognized that since the scanning light beam falls on all four plates 113, all four sets of photoelectric devices 229 will produce electrical signals. The output of the desired set of photoelectric devices 229 can be selected by electronic switching, and the outputs of the other sets of photoelectric devices 229 can be ignored, as will hereinafter be described. It is, therefore, possible to in effect select one of the four plates for read out with the exclusion of the other three.

*Data Block Layout*

Figures 2, 3, 4:
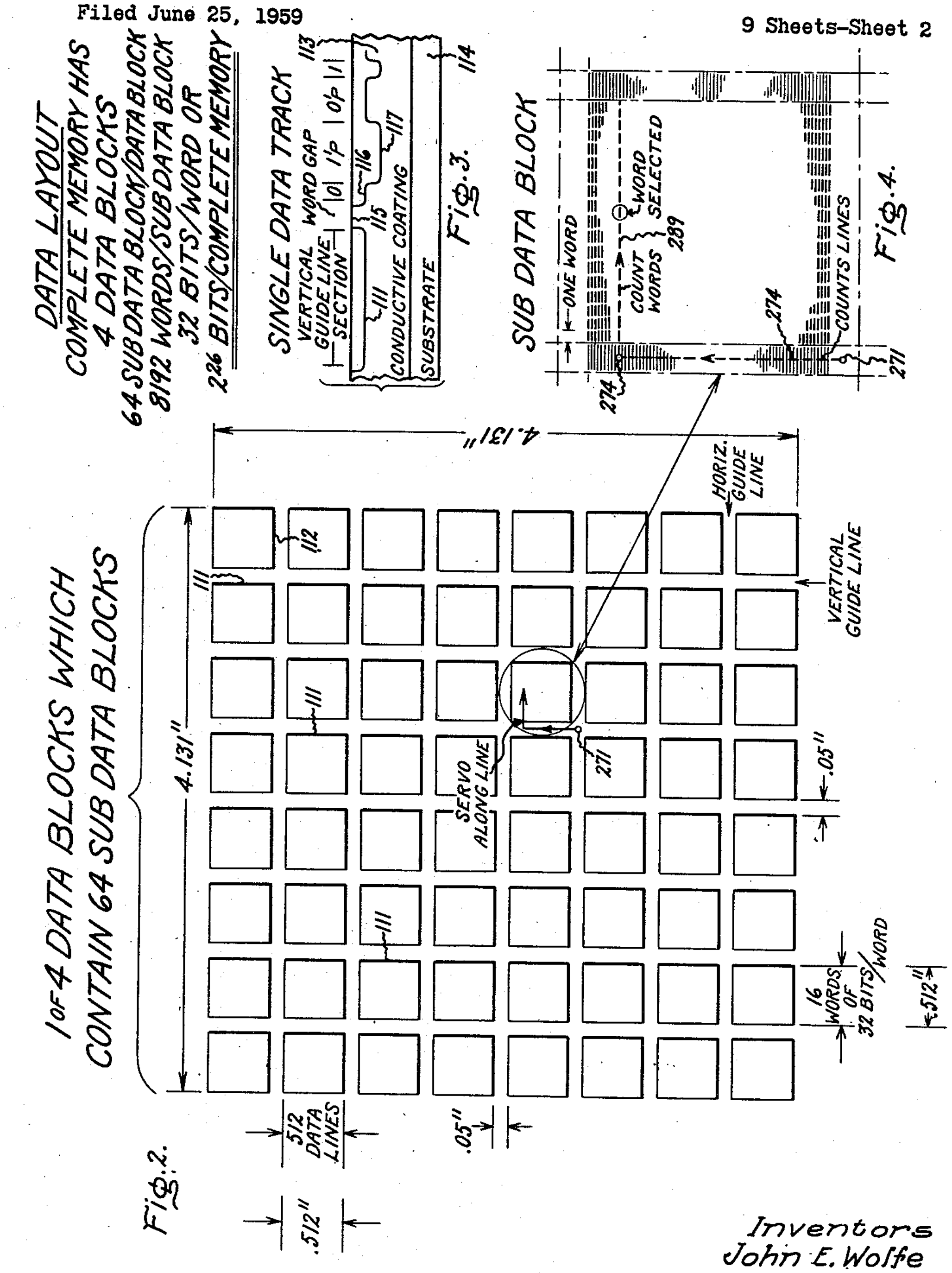
FIG. 2 is a plan view of a data storage plate showing the manner in which data is laid out on the face of the plate in accordance with the teachings of the present invention.
FIG. 3 is a cross-sectional view of a data storage plate of solid impressionable medium illustrating one manner in which data is recorded thereon.
FIG. 4 is a plan view of one of many sub-data blocks formed on the face of the data storage plate shown in FIG. 2 and illustrates the manner in which a desired word or bit of information stored on the data block is selected out for reading by the quick access data storage device.

A preferred form of recording data on the thermoplastic film impressionable surface of the data storage plate 113 is shown in FIGURE 2 of the drawings. The data is laid out on the data storage plates in a large rectangularly-shaped block formed by a number of spaced apart and regularly arranged rectangularly-shaped sub-blocks. In the preferred arrangement, there are 8×8 or 64 sub-data blocks arranged to define relatively wide intersecting avenues and streets, indicated at 111 and at 112, where the avenues by definition will be termed to run vertically up and down the sheet as shown at 111, and the streets will be termed to run horizontally as at 112. The avenues and streets are relatively wide, as is shown in FIGURE 3 of the drawings, wherein an avenue 111 is illustrated in contrast to the spacing between bits of information, and the spacing between words. It is intended that the width of the avenues and the streets be of the order of 50 mils, so that no difficulty will be involved in directly positioning a scanning beam of light to any desired intersection of a desired sub-data block. In one specific embodiment of the invention, it is anticipated that the sub-data blocks will be square in configuration, being approximately .512 inch long and .512 inch wide. A sub-data block of this size will contain approximately 512 lines of data spaced one mil apart with 16 words in each line spaced 1 mil apart and 32 bits of information contained in each word, with the centers between each bit of information being approximately 1 mil. FIGURE 3 of the drawing shows a partial cut-away through a thermoplastic film data storage plate 113 along one of the lines of data, written in accordance with the present invention. As shown in FIGURE 3, the data is formed in the thermoplastic surface 113 which is secured to a transparent conductive surface 110 formed on a suitable substrate or base plate 114 of glass or some other hard transparent material having the characteristics listed previously. The line of data is written into the thermoplastic film 113 by the electron beam writer tube 153 in the manner described above, and is controlled in such a manner as to form the avenues and streets shown in FIGURE 2. By continuous operation of the electron beam across those portions of the thermoplastic film where the avenues 111 are to be formed it is possible to form a relatively long continuous depression contiguous to each line of data to be written which can be used by the read out device for line counting purposes. Where it is desired to form a word gap spacing between words in a single data line, the electron beam will be blanked off so that no depression will be formed, as shown at 115, where the word gaps are to appear. Thereafter, the bits of information contained in each word will be written continuously side-by-side, with each bit occupying approximately 1 mil of space. It is anticipated that an electron beam current intensity of one value will produce a depression such as shown at 116 which will represent a zero when being read out by the readout optical system of the data storage device, and an electron beam current intensity of a second value will produce a depression of a different depth such as shown at 117. By the changes in depth of the groove written into the thermoplastic film 113, the readout optical system will determine whether any given bit written into a bit location represents a zero or a one in the binary number system.

*Writing Circuits*

Figure 5:
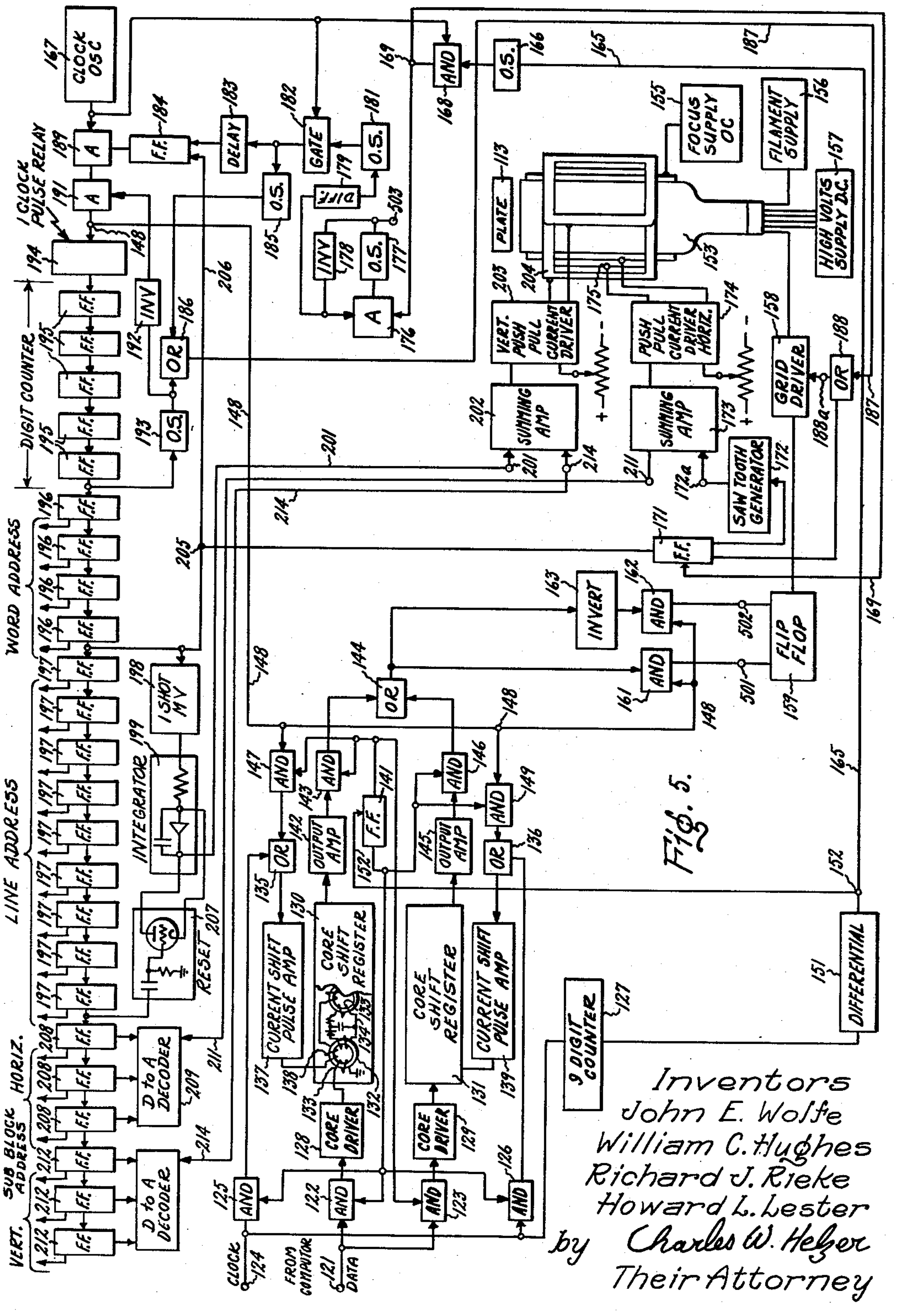
FIG. 5 is a functional block diagram of the writing circuits employed to run the electron beam writing beam apparatus comprising a part of the new improved quick access data storage device.

FIGURE 5 of the drawings shows the schematic block diagram of the writing circuit used with the electron beam writing apparatus 153 to write data on a thermoplastic film storage plate 113 in the manner illustrated in FIGURE 2 of the drawings. Data is supplied from a computer or other source of information to the writing circuit at the input terminal 121 where it is supplied in parallel to two and gates 122 and 123. Simultaneously, clock pulses are supplied from the computer along with the data to be written to an input terminal 124 which is connected to the input of two and gates 125 and 126, and to the input of a 9-digit counter 127. The gates 122, 123, 125 and 126 are all of conventional construction, such as are described on page 38 of the textbook entitled "Digital Computer Components and Circuits," by R. K. Richards, published by the Van Nostrand Company of Princeton, N.J., in 1957. The and gates 122 and 123 have their outputs connected to respective 512-bit core shift registers which are identical in construction, and hence only one of them will be described in detail. The and gates 122 and 123 have their outputs connected through respective core driver circuits 128 and 129 to the data input terminal of respective 512 bit core shift registers 130 and 131. Suitable core driver circuits 128 and 129 are described in chapter 3 of the textbook by Jacob Millman and Herbert Taub, published by McGraw-Hill Book Company, 1956. The core drivers 128 and 129 are connected to the first magnetic memory core unit, indicated at 132 in each of the 512-bit core shift registers 130 and 131. The 512-bit core shift registers 130 and 131 are constructed in a manner described in a pamphlet entitled "Analog Digital Converter Techniques," issued by the Massachusetts Institute of Technology, Summer Session Bulletin, 1956, on page 4.32. This core shift register is made up of a series of magnetic memory core units 132, which have a read-in coil 133 connected to a preceding core unit, or to a core driver 128, 129, as the case may be, and a readout coil 134 connected through a delay network to the read-in coil 133 of the next succeeding core unit 132. The memory core units operate as a logic unit by being either magnetized in one direction or the other, and information is shifted through the core shift register by means of clock pulses supplied thereto from the computer or other source of clock shift pulses. The clock pulses are supplied through the AND gates 125 and 126 to OR gates 135 and 136, respectively. OR gate 135 has its output connected through a pulse current amplifier 137 of conventional construction to a clock-in winding 138 of the first magnetic memory core unit 132 of the core shift register 130, and similarly OR gate 136 has its output connected through a pulse current amplifier 139 to the clock-in coil of the first memory core unit in the core shift register 131.

Data to be recorded on the thermoplastic film data storage plate 113 is supplied through either of the AND gates 122 or 123 to the core shift registers 130 or 131, where the data is shifted through the respective core shift registers by clock pulses supplied thereto through their associated AND gate 124 or 125. In operation, data will be supplied to one of the core shift registers, either 130 or 131, in advance of placing the electron beam writing tube 153 in operation, and that subsequently the data thus stored will be written on the thermoplastic film slate 113 by the electron beam writing tube. While the electron beam writing tube 153 is writing the line of data previously stored in one of the core shift registers, the computer can be storing a new line of data to be written in the remaining core shift register. To control which of the core shift registers is enabled to receive data from the computer. Flip-flop 141 has its normal output terminal connected to the AND gates 123 and 126, and its inverse output terminal connected to the AND gates 122 and 125. The flip-flop 141 is a conventional Eccles-Jordan type which is described on page 477 in the textbook entitled "Electron Tube Circuits," by Samuel Seeley, published by the McGraw-Hill Book Company in 1958. Flip-flop 141 produces an enabling potential at either its normal or inverse output terminals, which enabling potentials will open selectively either the AND gates 122, 125 or the two AND gates 123, 126, and data will be supplied from the computer to that core shift register whose associated AND gates are enabled.

In order to read out data stored in the core shift registers 130 and 131, supply the data to the electron beam writing tube 153, the core shift register 130 has its output connected through an output pulse amplifier 142 of conventional construction and output AND gate 143 to an OR gate 144, and the core shift register 131 has its output connected through an output pulse amplifier 145 and AND gate 146 to the OR gate 144. To control the reading out of data from the core shift registers, the normal terminal of the flip-flop 141 is connected to one of the inputs of the AND gate 143 and to the input of an AND gate 147. The AND gate 147 has bit rate clock pulses supplied to its remaining input terminal from a conductor 148, and has its output connected through the OR gate 135 and pulse current amplifier 137 to the clock-in winding 138 of the first magnetic memory core unit in the core shift register 131. By this arrangement, when the flip-flop 141 produces an enabling potential at its normal output terminal, the AND gate 143 will be opened, so that data may be read out to OR gate 144, and the AND gate 147 likewise will be enabled, so that clock pulses thereto over the conductor 148 may be fed to the clock-in winding of the first magnetic memory core unit of the core shift register for shifting the data out of the shift register through OR gate 144. In a similar fashion, the inverse output terminal of flip-flop 141 is connected to the AND gate 146 and to an AND gate 149. AND gate 149 has clock pulses supplied thereto from the conductor 148, and has its output connected through the OR gate 136 and pulse current amplifier 139 to the core shift register 131. Accordingly, when the flip-flop 141 supplies an enabling potential from its inverse output terminal to the AND gates 12 and 125, the core shift register 130 will be enabled to receive data from the computer, and the AND gates 146 and 149 will be enabled to read out data from the core shift register 131 to the OR gate 144.

Whether flip-flop 141 provides an output potential at its inverse or normal output terminals is determined by a switching signal supplied thereto from the 9-digit counter 127 through a differentiating circuit 151, across a conductor 152 to the trigger input terminal of the flip-flop. The 9-digit counter 127 is of conventional construction as described in the reference text by Millman and Taub, chapter 11, and serves to count up to 512 bits, which are the number of bits of information contained in a single line to be written. This counter, when it has received 512 bit clock pulse counts from the computer connected to input terminal 124, will reset itself to zero and produce an output counter full signal pulse. This counter full signal pulse is differentiated by a conventional differentiating circuit 151, and supplied through the conductor 152 to the trigger input terminal of flip-flop 141. This results in changing the condition of operation of the flip-flop 141 thereby reversing the connections of the two core shift registers 130 and 131 in the above described manner.

The electron beam writing apparatus comprises an ultra-high resolution cathode ray tube 153 capable of producing a scanning beam of electrons having a spot diameter in the order of fractions of a mil. The tube has a rated anode voltage on the order of 5–15 kv. and is capable of a wide angle of deflection on the order of 19° in both the horizontal and vertical directions. It is anticipated that the cathode ray tube 153 will be supported in the vacuum enclosure 11 without the normal phosphorus screen over the end thereof but with the thermoplastic film plate 113 supported within its field of view in the manner depicted in FIGURE 1 of the drawings. A cathode ray tube suitable for this use is manufactured and sold commercially by CBS Hytron Company, Danvers, Mass., and is described in their Engineering Data Bulletin E–333. A conventional direct-current focus supply 155, a filament supply 156, and high-voltage direct-current supply 157 are connected to the tube in a conventional manner. In addition, the tube 153 contains a modulation control grid to which a modulation voltage is supplied from a grid driver circuit 158. The grid driver circuit 158 is of conventional construction comprising a switching clamping circuit of the type described on page 305 of the Seely text followed by a desired number of conventional amplification stages, and is connected to the output of a flip-flop 159. Flip-flop 159 has its SET input terminal connected through an AND gate 161 to the output of OR gate 144, and its RESET input terminal connected through an AND gate 162, and an inverter circuit 163 to the output of OR gate 144. The inverter or NOT circuit 163 is of the type described in the textbook entitled "Pulse and Digital Circuits," by Jacob Millman and Herbert Taub, published by the McGraw-Hill Book Company in 1956, on page 400 thereof, wherein an output potential appears at the output of the circuit which is the inverse of the input potential. The AND gates 161 and 162 both have enabling bit clock pulses supplied thereto from the conductor 148. By reason of this arrangement, upon both AND gates 161 and 162 being clocked open by bit clock rating pulses supplied over the conductor 148 a triggering signal will be supplied from one of the other AND gates to flip-flop 159. In the event there is no-output signal from the OR gate 144 representing a zero in the data being supplied from the core shift registers 130 or 131, the zero potential will be inverted by inverter 163 and applied through AND gate 162 to the reset terminal of flip-flop 159, thereby resetting it to its OFF condition and producing a zero output potential on its output terminal which is connected through the grid driver 158 to the modulating control grid of the electron beam writing tube 153. Conversely, if there is a potential at the output of OR gate 144 representing a one in the data supplied thereto from the core shift registers, the one potential will be inverted by inverter 163, and hence will not get through AND gate 162. However, the one output potential appearing at OR gate 144 will be supplied through AND gate 161 to the SET terminal of flip-flop 159, thereby producing a one output potential at its output terminal which is supplied through the grid driver 158 to the modulating control grid of the electronic beam writing tube 153. Accordingly, two different potentials will be applied to the modulating control grid of the electron beam writing tube 153, which, as indicated in FIGURE 3 of the drawings, will produce a track in the thermoplastic film covering of a first depth as shown at 116 to represent a zero and at the second depth 117 to represent a one in the data being recorded. The track thus formed may then be used to record the data supplied from the core shift registers 130 and 131.

In order to properly locate the lines of data in desired sub-blocks within the block of data in the manner described in relation to FIGURES 2, 3, and 4, it is necessary to develop and record an address for the data being written. This address may be supplied to the computer or other address memory of a device using information to be stored on the thermoplastic film plate 113. For this purpose, the differentiated line count pulse appearing at the output of the 9-digit counter 127 is supplied over a conductor 165 to a one-shot multi-vibrator 166 of conventional construction. The one-shot multi-vibrator 166 produces a prolonged pulse having a time duration approximately equal to but a little bit longer than one clock pulse put out by a free-running crystal controlled clock pulse oscillator 167, shown at the upper right-hand edge of the drawing. Clock pulses from the clock pulse oscillator 167 are supplied to an AND gate 168, together with the output potential derived from the one-shot multi-vibrator 166, and because of the time duration of the output potential of the one-shot multi-vibrator 166, it will be assured that a clock pulse from the oscillator 167 will be allowed to pass through the AND gate 168 at the beginning of a line of data. This clock pulse will then be supplied over a conductor 169 to the SET input terminal of a flip-flop 171. The flip-flop 171 has its normal output terminal connected to a horizontal sawtooth sweep potential generator 172, whose output in turn is supplied through a summing amplifier 173, and push-pull current driving amplifier 174 to the horizontal deflection yoke 175 of the electron beam writing tube 153. The flipflop 171 is of conventional two input terminal, two output terminal type, described in any one of the above reference texts by Seeley or Millman and Taub, and the horizontal sawtooth generator 172 is a conventional relaxation type oscillator such as is described in textbook by Seeley in chapter 15, page 514. The summing amplifier 173 may be of the type as described in the above referenced textbook by Seeley on page 251, and the push-pull current driver amplifier 174 likewise comprises a conventional push-pull driver amplifier of the type described in the textbook issued by the Radiation Laboratory of M.I.T., entitled "Cathode Ray Tube Display," Rad. Lab. Series No. 22, on page 372, FIGURES 10–13. For the purpose of the present discussion, it is assumed that no data has heretofore been written by the circuit, and that therefore it is desired to initiate a complete new block of data on the plate 113, as described in connection with FIGURE 2, and that the first bit of information to be written will be the first bit, of the first line of data, in the first sub-block. By design, this bit of information may be located at any one of the four corners, but for the purpose of the present discussion, it will be assumed that it represents the bit of information to be located in the lower left-hand corner of the plate illustrated in FIGURE 2 of the drawings. It is also assumed that the core shift register 130 has been filled, and that the 9-digit counter has produced counter full output pulse which conditions the core shift register to read the data out through OR gate 144, and flip-flop 159, to grid driver 158. The counter full trigger pulse produced by the 9-digit counter 127 also will go through the AND gate 168 in the above described manner, to set flip-flop 171 and start the horizontal sawtooth generator 172. This will cause the electron beam of tube 153 to trace across the first line of data to be recorded in the first sub-block. The pulse which got through AND gate 168 to trigger flip-flop 171 and sawtooth generator 172 is also supplied to an AND gate 176 which has its output connected to a one-shot multivibrator 177. Multi-vibrator 177 has its output connected back through an inverter circuit 178 to the input of AND gate 176. The one-shot multi-vibrator 177 is of conventional construction and has its time duration of operation adjusted to provide output signal potential which is equated to the 50-mil spacing of the avenues located adjacent each sub-block of data as shown at 111 in FIGURE 3 of the drawings. By reason of this arrangement, AND gate 176 will normally be enabled upon the first clock pulse being supplied thereto from AND gate 168, but will be dis-enabled thereafter for a period of time to allow for the writing of the line marks in the space provided for avenue 111.

At the end of the duration of the signal pulse put out by one-shot multi-vibrator 177, a trigger pulse will be produced by a differentiating circuit 179 connected to the output of inverter 178, which trigger pulse will be supplied to a second one-shot multi-vibrator 181. One-shot multi-vibrator 181 is adjusted to put out a signal potential having a time duration slightly shorter than one clock pulse and is connected to an AND gate 182 also having clock pulses supplied thereto from clock pulse oscillator 167. The timing of the point at which the differentiator circuit 179 triggers one-shot multivibrator 181 is adjusted so that it is assured that it is triggered somewhere midway between clock pulses, and by adjusting the time duration of the one-shot multivibrator 181 output potential to be shorter than the spacing between clock pulses, it will be assured that only one clock pulse will be supplied through an AND gate 182. This clock pulse is then supplied through a delay circuit 183 to the SET input terminal of a flipflop 184, and is also supplied to a one-shot multivibrator 185. One-shot multivibrator 185 has its output connected through an OR gate 186 back through a conductor 187 and an OR gate 188 to a blanking connection on grid driver amplifier 158 may be of the type described in the above-identified reference text book by Seeley on page 305, and serves to cut off the grid driver amplifier 158 for the period of time that a potential is supplied thereto from one-shot multivibrator 185. One-shot multivibrator 185 is adjusted so that the time duration of its output potential corresponds to the blanking space of about 1 mil representing the word gap spacing shown at 115 in FIGURE 3, which is to occur at the beginning of each line of data being recorded. Accordingly, during this portion, of the horizontal trace, the electron beam of the tube will be blanked off so that no impression will be made on the surface of the thermoplastic film 113. Subsequently, the clock pulse supplied through delay circuit 183 triggers flipflop 184 to its SET condition. Flipflop 184 has its normal output terminal connected to an AND gate 189 which is connected to the output of the free-running clock pulse oscillator 167, and serves to enable the AND gate 189 so that the clock pulses may be supplied therethrough to a second AND gate 191. The AND gate 191 has its second input terminal supplied from an inverter 192, whose input is connected to the normally quiescent output of a one-shot multivibrator 193, the function of which will be described hereinafter. The one-shot multivibrator 193 likewise has a time duration which corresponds to the one-mil spacing between words and its output is connected also through the OR gate 186 back through conductor 187 and OR gate 188 to the blanking connection of the grid driver amplifier 158. The one-shot multivibrator 193 therefore serves to produce a blanking pulse at the end of each word to provide the blank spacing 115 in between each work in the line of recorded data on the surface of the thermoplastic film plate 113. At this point in its operation, however, there will be no output potential from the one-shot multivibrator 193 so that the inverter 192 will provide an enabling potential to the AND gate 191. Accordingly, the clock pulses from the free-running clock pulse oscillator 167 will be supplied through AND gate 191 to a delay circuit 194. Concurrently with the above operation, clock pulses from the free-running clock pulse oscillator 167 will be supplied across the conductor 148 to clock out the data in the core shift registers 130 or 131 and supply the same to the electron beam writing tube 153 in the previously described manner.

The clock pulses from the free-running clock pulse oscillator 167 supplied through the delay device 194 are delayed for a period equal approximately to the spacing of one bit of information, and are then supplied to the input of a register counter comprised by five flip-flops 195. The five flip-flops 195 form a conventional binary counter and register circuit as described in the above-referenced text to Millman and Taub in chapter 11 for counting digits up to the binary number 32, which is the number of bits of information contained in a word. At the end of 32 bits of information, the digit counter formed by the five flip-flops 195 will reset to zero, and will produce a counter full output pulse which is supplied to the input terminals of the first flip-flop amplifier 196 in a word address counter register, and to the one-shot multivibrator 193. The one-shot multivibrator 193 will then operate through OR gate 186 and conductor 187 to blank the grid driver amplifier 158 in the previously described manner to insert a blanking space, such as 115, between the word just written and the next succeeding word in the line. The output of one-shot multivibrator 193 is also supplied to the inverter 192 which removes the enabling potential from AND gate 191. This allows AND gate 191 to close, thereby preventing the application of a clock pulse from the free-running clock pulse oscillator to the bit or digits counter 195, while the blanking space 115 between words is being formed on the surface of the thermoplastic plate 113. Thereafter, the dis-enabling potential from one-shot multivibrator 193 is removed so that inverter 192 again enables AND gate 191 to be opened to allow for the recording of the next 32 bits of information in the next succeeding word in the line. This operation is then repeated throughout all the words in the line of data to be recorded, and as each word is recorded, a trigger pulse will be produced at the input flip-flop 196 in the word address counter register formed by four such flip-flops 196, until a complete line of 16 words has been written across the sub-block.

Upon the completion of recording a line of data, the word counter register formed by the flipflops 196 will be reset to zero, and a counter full output pulse will be supplied to the first flip-flop amplifier 197 in a line address counter register formed by nine such flip-flops 197. It will be noted that upon this occurrence, 512 bits of information have been written. The writing process then ceases until the next counter full occurs at the output of the 9-digit counter 127 indicating that the computer has loaded register 130 or 131 with the information for the next data line. The counter full pulse produced in the output of the 9-digit counter 127 causes the flipflop 141 to connect the alternate core shift register 131 to supply its data output through the OR gate 144 and flip-flop 159 through grid driver 158 to the electron beam writing tube 153. As these two events occur simultaneously, it is of course necessary to shift the writing beam of the electron beamwriter tube 153 down one line, to return the horizontal position of the writing beam to the zero or reference point, and to reset the line counting register formed by the flip-flops 195 and 196 to zero. In order to shift the electron writing beam of the writing tube 153 down one line vertically, the end of line gating pulse is supplied to a one-shot multivibrator 198 of the type described in Millman-Taub reference textbook, chapter 6, shown in FIGS. 6–10. The one-shot multivibrator 198 has its output connected to an integrator circuit 199 of the type described in Terman's textbook entitled "Electronic and Radio Engineering," on page 623. Integrator circuit 199 serves to integrate the potential supplied from the one-shot multivibrator 198, and to build up stepwise with successive voltage pulses supplied from multivibrator 198, the charge across a capacitor comprising a part thereof in a saw-tooth fashion. The output potential developed by the integrator type saw-tooth wave sweep potential generator 199 is supplied over a conductor 201 through a summing amplifier 202 and push-pull vertical current driver amplifier 203 to the vertical deflection yoke 204 of the electron beam writer tube 153. The vertical push-pull vertical current driver amplifier 203, as well as the horizontal push-pull current driver amplifier 174 may both be of the type described in the textbook issued by the Radiation Laboratory of Massachusetts Institute of Technology entitled "Cathode Ray Tube Display, Radiation Lab.," Series No. 22, on page 372, FIGS. 10–13. By this arrangement, the integrator sweep generator 199 will apply a step increase in potential through the summing amplifier to the vertical deflection yoke of the electron beam writing tube 153 to cause it to move up one line vertically, which is a spacing of about one mil as described in connection with FIGS. 2, 3, and 4 of the drawings.

Concurrently with the resetting of the vertical position of the beam of electron writer tube 153 up one line, the horizontal saw-tooth generator 172 is returned to its zero position by a line gate pule supplied across the conductor 205 to the reset input terminal of flip-flop 171. This line gate pulse resets flip-flop 171 to allow the saw-tooth generator 172 to return to its zero position until flip-flop 171 is again set by a start pulse supplied from the 9-digit counter 127 through one-shot multivibrator 166 across conductor 169, to again start the cycle of writing in a new line of data as described above. Simultaneously with this operation, the end of line gating pulse produced upon the flip-flop 196 being reset to zero is supplied across the conductor 206 to the flip-flop 184, to reset that flip-flop to its zero output condition. This results in disconnecting the clock pulse oscillator 167 from the line and digit counter register formed by flip-flops 195 and 196 until the starting circuits have been cycled through their operation at the beginning of the new line of data to be printed.

The above described cycle of operation is carried out throughout each of the 512 lines in the sub-block of data, with the cycle just described being repeated at the end of the recording of every line of data in the sub-block. At the end of each such line recorded, the line address counter register formed by the flip-flops 197 will be shifted one position until this counter register is filled thereby indicating that the complete sub-block of data has been recorded. At the end of the recording of the sub-block of data, all of the flip-flops 197 will be returned to zero and a sub-data block complete output gating pulse will be produced by the last flip-flop 197 which is supplied back to an integrator reset circuit 207. The integrator reset circuit 207 serves to discharge the capacitor in the integrator saw-tooth wave vertical sweep potential 199 so as to return this generator to its zero position.

Concurrently with returning the vertical sweep potential generator 199 to its zero position, the sub-data block complete output gating pulse is supplied to the first flip-flop 208 in a horizontal sub-data block position counter register made up of three such flip-flop amplifiers 208. The flip-flops 208 serve to count the number of sub-data blocks recorded, and apply output potentials to a digital analog converter 209 connected to the output of the three flip-flops 208. The construction of the digital analog converters 209 is described in a pamphlet entitled "Analog to Digital Conversion," issued by the Massachusetts Institute of Technology Summer Session, 1956, on page 5.1. This converter serves to derive an analog potential which is supplied through a conductor 211 to the summing amplifier 173 and the horizontal deflection circuits of the electron beam writing tube 153. This potential serves to shift the zero or reference horizontal starting position of the electron beam of the writing tube 153 to a new zero starting position corresponding to the beginning of the avenue of the next adjacent horizontal sub-block of data to be recorded. Thereafter, the above-described operations relating to the recording of a sub-data block are again repeated throughout the entire lower line of eight sub-data blocks. Upon completion of the recording of the lower line of eight sub-data blocks, the three flip-flops 208 will reset to zero, which will remove the potential that served to shift the horizontal zero or reference starting position of the horizontal sweep of the writing electron beam produced by tube 153 so as to allow it to return to the first vertical line of sub-data blocks. Concurrently, a line of sub-data block's complete output gating pulse is supplied to the first flip-flop 212 in a vertical sub-data block position counter register formed by three such flip-flops. Each of the flip-flops 212 supplies output potentials to a digital analog converter 213 which is similar in construction to the converter 209, and serves to develop an analog potential corresponding to the vertical line of sub-data block being written. This analog potential is supplied across a conductor 214 through the summing amplifier 202 to the vertical deflection circuits of tube 153, causing the vertical zero or reference position of the electron beam of the writer tube 153 to be shifted vertically upwardly to the next horizontal line of sub-data blocks to be recorded. It should be noted that this shift in position also provides for the spacing of the horizontal street in between each horizontal line of sub-data blocks, and that the operation is repeated throughout the total of eight horizontal lines of sub-data blocks until the entire block of data has been recorded. Concurrently with recording of the data, the address of the data thus recorded is supplied through the counting circuits 195, 196 and 197, 208, 212, to the computer or other device whose memory will utilize such address information when subsequently using the data recorded on the thermoplastic data storage plate 113.

*Reading System Optics*

Figures 6, 7, 9:
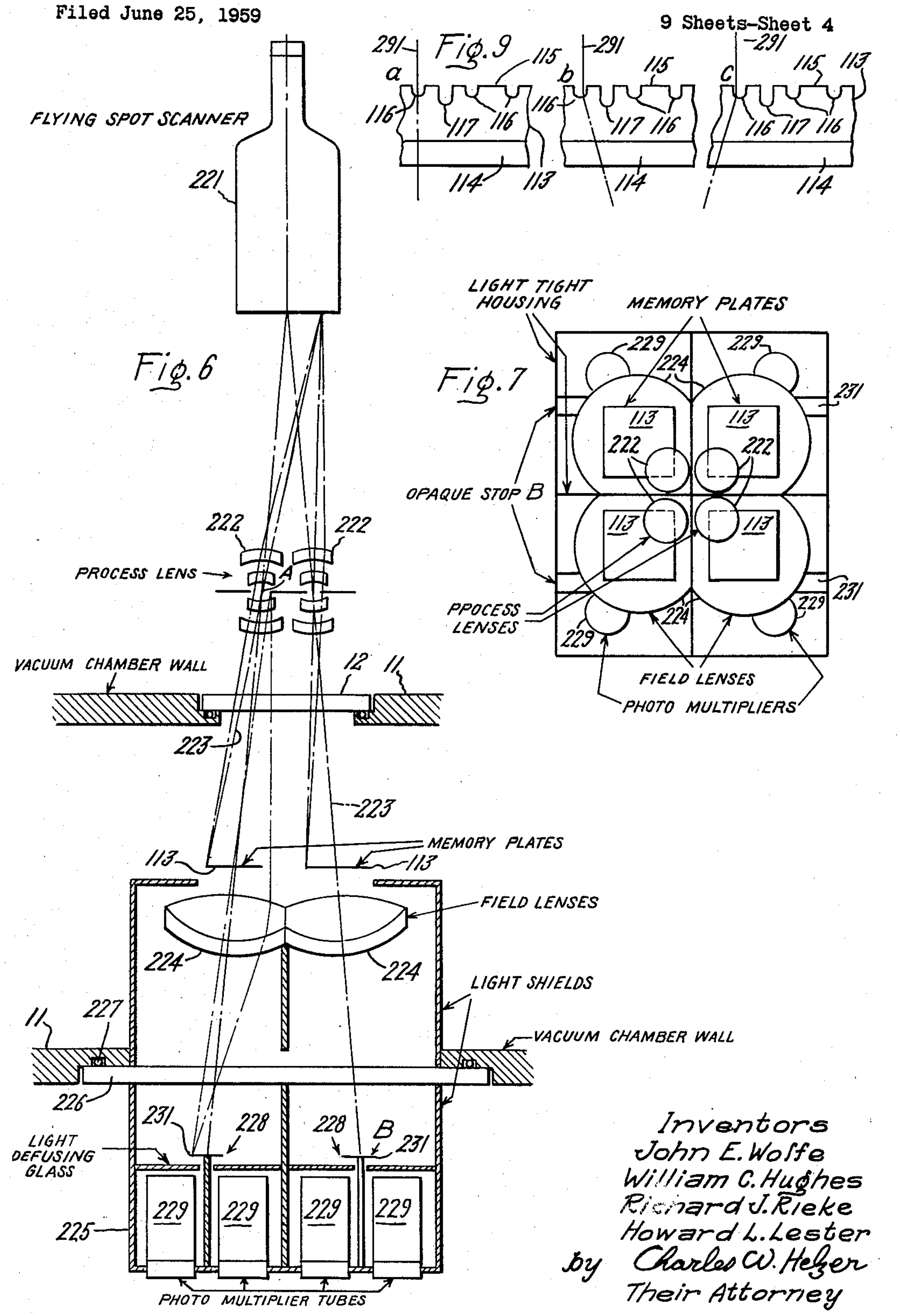
FIG. 6 is a side view of a read-out arrangement comprising a part of the data storage device.
FIG. 7 is a sectional view of the arrangement illustrated in FIG. 6 taken through plane A—A.
FIG. 9 is a cross-sectional view of a data storage plate taken transversely to the cross-sectional view of FIG. 3 and illustrates the manner in which a scanning beam of light is refracted by the data lines formed in a solid impressionable medium data storage plate.

FIG. 6 of the drawings shows the physical arrangement of the read-out means used to read-out data information stored on the thermoplastic film plate shown at 113. The thermoplastic film plates 113 are supported in a rectangular array, there being four such plates arranged to be illuminated by a flying spot scanner tube 221 scanning light beam source. The thermoplastic film plates 113 are supported in a suitable holder within an evacuated space defined by the walls of the housing member 11 as described in connection with FIG. 1 of the drawings. Insofar as the operation of the readout means is concerned, it is not necessary that the plates be supported within an evacuated space; however, in order to facilitate exchange of the plates being read out with the electron beam writing apparatus, wherein it is necessary that the plates be supported in an evacuated space, for design purposes it has been deemed convenient to also include the plates being read out by the readout means in the same evacuated space. The thermoplastic film storage plates 113 are positioned to view the flying spot scanner 221 in the manner shown in FIG. 7 of the drawings, so that the flying spot scanner can be adjusted to illuminate any desired portion of any one of the four plates. For this purpose, a set of four process lenses 222 are positioned between the wall of the vacuum chamber 11 in which a window 12 is disposed and the flying spot scanner 221 for imaging the scanning light beam produced by the flying spot scanner 221 on any one of the four thermoplastic film storage plates 113. There are four such sets of process lenses which are conventional optical systems for imaging the entire raster of the cathode ray tube base of the flying spot scanner tube 221 on a respective one of the thermoplastic film storage plates 113. This light image is projected through the transparent window 12 in the manner depicted by the lines 223 which represent the beams of light projected by the process lens assemblies 222. The light rays after they pass through any one of the selected thermoplastic film storage plates 113 are imaged by a field lens assembly 224, there being one such field lens 224 for each of the thermoplastic film storage plates 113. Field lens assemblies 224 are supported within a box-shaped light shield structure 225, which is supported on the vacuum-tight housing 11 in a manner to preserve the vacuum-tight character of the evacuated space within the housing. For this purpose, a glass window 226 seated over a sealing ring assembly 227 is secured midways between the light shielding housing 225, and the light beam projected by each of the field lenses 224 passes through this window onto a set of photoelectric devices indicated generally at 228. The photoelectric devices comprise conventional photomultiplier tubes which serve to convert the light beam to an electrical signal representative of the data intelligence stored on the thermoplastic film storage plate 113. There are two such photomultiplier tubes 229 for each of the thermoplastic film storage plates 113 arranged to view the light emanating from the storage plates in the manner shown in FIG. 7 of the drawing. The set of two photomultipliers positioned to view each thermoplastic film storage plate 113 is separated by an opaque stop 231 upon which the light beam is imaged by the field lens 224 in the event that there is no data bearing impression in the thermoplastic film storage plates 113. This arrangement can be best understood by referring to FIG. 3 of the drawings, wherein the impressions made into the thermoplastic film are illustrated. As the light beam is caused to trace across a portion of data-bearing information contained in any line of data impressed on the thermoplastic film storage plate 113, as at say 111, 116 or 117, the light beam will be caused to be diverted to either one of the photomultipliers 229 to the side of the opaque stop 231. However, upon the light beam reaching a portion where no intelligence conveying track mark has been formed, as at 115, in the gaps between words, the light will be imaged upon the opaque stop 231, due to the non-refractory character of the surface of the thermoplastic film storage plate 113 at these points. The manner in which the photomultiplier tubes 229 then function to derive intelligence from the electrical signals developed thereby is best understood in connection with FIG. 8 of the drawings.

*Reading System Circuitry*

Figure 8:
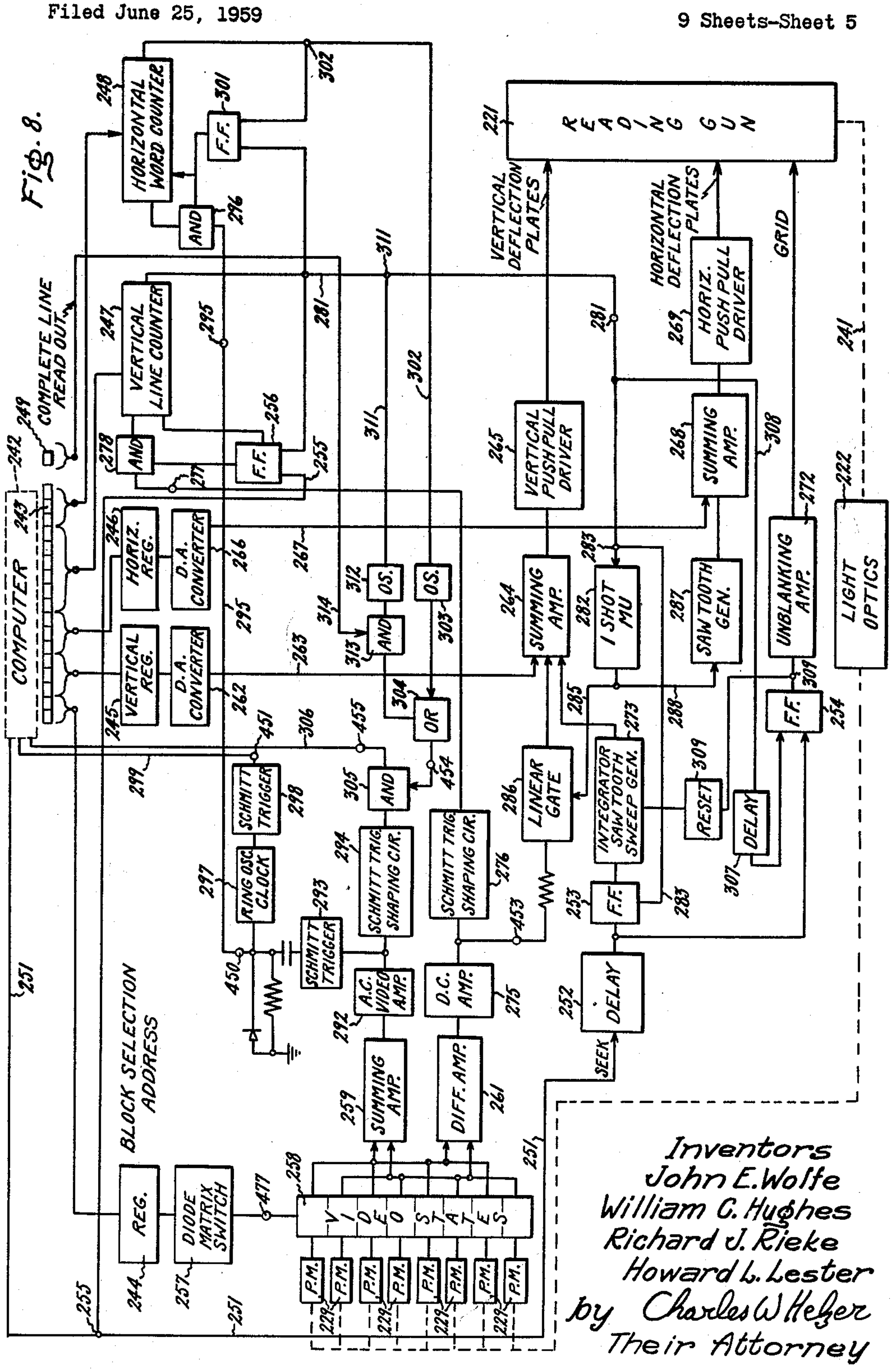
FIG. 8 is a functional block diagram of the electrical circuitry used with the read-out arrangement of FIGS. 6 and 7.

The circuits used in deriving and utilizing the data stored on the thermoplastic film data storage plate 113 and read out by the flying spot scanner read-out tube 221, in conjunction with the photomultiplier tubes 229 is shown in FIG. 8. The optical path interconnecting the scanning beam of light developed and traced across the thermoplastic film storage plates 113 by the flying spot scanner 221 is shown in the lower right hand corner of FIG. 8 by the dotted line 241 which passes through the light optics arrangement formed by the process lens assemblies 222 and the field lens 224 and falls upon a selected pair of the photomultiplier tubes 229. In reading out information stored on one of the thermoplastic plates 113, a computer illustrated generally at 242, must supply the address of the desired data recorded on the plate 113 to the reading system. For this purpose the computer supplies the address of the desired data from its readout circuits shown at 243 to a block selection address register 244, to a vertical position sub-block selection address register 245, to a horizontal position sub-block selection address register 246, to a vertical line counter circuit 247, and to a horizontal word counting circuit 248. The address supplied by the computer to each of these address registers and counter circuit, therefore, serves to preset each of the registers and counter circuits to the desired word recorded on the surface of the thermoplastic film storage plate 113. If it is desired to read out an entire line of data in any one of the sub-blocks of the thermoplastic film storage plate 113, a complete line read-out signal is supplied from a separate output circuit from the computer 249 to the logic circuits and no word selection address to the horizontal word counter 248 is required. Should it be desired to read out an entire sub-block of data, it is necessary that the computer sequentially address the lines of the desired sub-block and read them out one at a time by sequentially providing the address of each line in the sub-block to the vertical line selection counter circuit 247 until the entire sub-block of data has been read out. This, of course, is achieved by properly programming the computer 242, which it is assumed is designed in such a fashion that such programming is made possible. Similar programming of the computer can be provided to read out successive sub-blocks on the thermoplastic film storage plate 113 for reading out all of the data information stored on the plate 113 should it be desired. For the purpose of the present example, however, it is assumed that only a single word in a specified sub-block of data is desired by the computer.

After the computer has completed sending the address of a desired word to the address registers, the vertical line counter and the horizontal word selection line counter, it puts out a seek signal which is supplied over a conductor 251 through a delay device 252 to a flip-flop amplifier 253 and a flip-flop amplifier 254 in parallel. Concurrently, the seek signal is supplied over the conductor 255 to a flip-flop amplifier 256. Prior to sending out the seek signal, however, the computer has supplied to the block selection address register 244 the address of the particular one of the four thermoplastic film storage plates 113 on which the desired word is recorded. Block selection address register 244 then supplies a gating signal through a diode matrix switch 257 to a set of video gating circuits 258 which then function to connect the set of two photomultiplier tubes 229 which are positioned to read out data from the desired thermoplastic film storage plate 113. The diode matrix switch 257 is of conventional construction as described on page 4.6 of the report issued by Massachusetts Institute of Technology 1956 Summer Session on Analog to Digital Converter Techniques, and function to energize selected pairs of the video gates 258. The video gates 258 are of standard construction as desribed in Millman and Taub text on page 435, and function to select two of the photomultipliers 229 and to connect these two selected photomultipliers 220 to a summing amplifier output circuit 259 and to a difference amplifier output circuit 261. This operation therefore services to select out the desired data storage plate 113 on which the pre-selected word is recorded. Concurrently, the sub-block vertical position selection address register 245 has supplied a vertical position output signal through a digital to analog converter 262 connected to the output of the register 245. The electric analog signal developed by converter 262 is supplied across a conductor 263 to a summing amplifier 264 that is connected through a vertical driver circuit 265 to the vertical deflection yokes of the flying spot scanner read-out tube 221. Concurrently, the sub-block horizontal position selection address register 246 supplies a horizontal position signal through a digital to analog converter 266 across a conductor 267 to a summing amplifier 268 having its output connected through a horizontal driver circuit 269 to the horizontal deflection yoke of the flying spot scanner read-out tube 221. The two currents thus supplied to the vertical and horizontal deflection yokes of the flying spot scanner tube 221 cause deflection currents to be applied to these two yokes which would position the scanning beam of light of the tube at a particular intersection of an avenue and street bordering the desired sub-block of data as indicated at the point 271 in FIG. 2 of the drawings. Thereafter, the seek signal supplied from the computer over the conductor 251 to flip-flop 254 causes flip-flop 254 to remove the inhibiting action of an unblanking amplifier 272 connected to the control grid of the flying spot scanner tube 221. The removal of the unblanking signal from the control grid of tube 221 then allows the scanning beam of light to be turned on so that a light spot appears at the position 271 shown in FIG. 2 of the drawings. Because all of the circuit components mentioned thus far are of conventional construction and details may be found in the reference text mentioned above, a further description of their construction and operation is believed unnecessary. With regard to the flying spot scanner tube 221 the same type cathode ray tube may be used as was used in the writing system described previously with the variation that the tube is provided with a phosphor coated face and is self-evacuated.

Simultaneously with the setting of the scanning beam of light to position 271 shown in FIG. 2 of the drawings, the seek signal supplied from the computer over conductor 251 serves to set flip-flop 253 to its set condition. Flip-Flop 253 then energizes an integrator type saw-tooth wave form vertical sweep potential generator 273 whose output is connected through the summing amplifier 264 and vertical driver circuit 265 to the vertical deflection yoke of the flying spot scanner tube 221. This saw-tooth wave form vertical sweep potential then causes the scanning beam of light to move up a track indicated at 274 in FIG. 4 of the drawings along the avenue bordering the side of the selected sub-block of data. As the scanning beam of light moves up this avenue along track 274 it will cross the line tracks shown at 111 in FIG. 3 contiguous to each line of data recorded in the selected sub-block. As the scanning beam of light crosses each individual line 111 in its upward movement it will develop an output signal pulse in the difference amplifier 261 which is supplied through a D.-C. video amplifier 275, and Schmitt trigger shaping circuit 276 over a conductor 277 to an AND gate 278. The AND gate 278 is connected to the output of the flip-flop amplifier 256 which was placed in its SET or ON condition by the seek signal supplied from the computer over the conductor 255. Accordingly, the AND gate 278 will be enabled, and the line count pulses supplied out of difference amplifier 261 will be coupled to the input of the vertical line counting circuit 247. The details of construction and operation of the vertical line counter 247 will be disclosed more fully hereinafter; however, it is believed adequate to point out that the vertical line counter 247 is a pre-set type of counter which may be pre-set to any desired number, and upon this desired number of input line count pulses being supplied to the circuit, it resets itself to zero, and puts out a counter full signal pulse from its output. This counter full signal pulse is supplied over a conductor 281 back to the flip-flop 256, and serves to set this flip-flop to its OFF condition thereby disenabling the AND gate 278 to prevent the application of further line count pulses to the counter. The line counter full signal pulse is also supplied back over a continuation of the conductor 281 to a one-shot multivibrator 282, and across a conductor 283 to the reset input terminal of the flip-flop amplifier 253. As a consequence, the flip-flop 253 is reset to its OFF condition so that no further energizing potential is supplied to the integrator type saw-tooth wave vertical sweep generator circuit 273. This circuit, thereafter, will operate to hold the current applied to the vertical deflection yoke at the level at which the desired line count filled the preset line counter 247 which will be at the upper point 274 shown in FIG. 4 of the drawings.

The one-shot multivibrator 282 produces an output signal potential which will last for a period required to trace across one line of data and supplies this potential over a conductor 285 to a limiter gate circuit 286. The limiter gate 286 is a conventional bidirectional gate such as is described in Millman and Taub text on page 128, and operates to clamp the output of the difference amplifier 261 and D.-C. amplifier 275, which are connected to input of the summing amplifier 264 to ground. The limiter gate 286 essentially comprises a two-way clamping circuit for initially clamping this input summing amplifier 264 to ground while the scanning beam of light is caused to trace up the track 274 by the vertical sweep generator. This prevents the signal developed by difference amplifier 261 from causing the scanning beam of light to wobble while moving up trace 274. The potential applied by one-shot multivibrator 282 to limiter gate 286 removes this clamp, and allows the servoing signal to be developed by difference amplifier 261 to be applied to summing amplifier 264. The summing amplifier using this servoing signal from the difference amplifier 261 then maintains the gating beam of light centered on its vertical position at the end of the trace 274 as it is caused to scan along the selected line of data by the horizontal deflection sweep circuits to be described hereinafter.

The horizontal deflection circuit is energized by a conventional relaxation type saw-tooth wave shape horizontal sweep potential generator circuit 287 which is triggered on by the switching potential supplied from the output of the one-shot multivibrator 282 over conductor 288. The one-shot multivibrator 282 will produce an output potential extending over a period of time required to trace across one line of data, and accordingly the saw-tooth wave shape horizontal sweep potential generator 287 will be energized over a similar time period. Saw-tooth generator 287 then develops a saw-tooth wave shape horizontal deflection potential that is supplied through the summing amplifier 268 and horizontal driver amplifier 269 to the horizontal deflection yoke of the flying spot scanner tube 221. As a consequence, the read-out scanning beam of light will be caused to move from the position at the end of the trace 274 shown in FIG. 4, across the desired line of data over the track indicated at 289. As the scanning beam of light is caused to move across this line, it will be maintained centered on the line by the servoing arrangement mentioned above.

The manner in which this servo in action is obtained is best illustrated in FIG. 9 of the drawings wherein cross-sections of a thermoplastic film plate 113 are shown, and it is to be understood that the cross-sections shown in FIG. 9 are transverse to the cross-sections illustrated in FIG. 3, and that the observer is looking down along the axis of a line of data. In FIG. 9, the track of the scanning beam of light is depicted by the broken line 291 wherein, in FIG. 9*a*, the beam of light is shown centered on a particular line of data being read out. With the scanning beam of light thus centered, the amount of light falling on the set of two photomultipliers viewing the thermoplastic film plate 113, will be approximately equal so that the output of the difference amplifier will be substantially nil since the output signals from both photomultipliers will be approximately equal and will buck each other out in the difference amplifier. Assume a different condition, however, where the scanning beam of light 291 has moved to one side or the other as depicted in FIGS. 9*b* and 9*c*. Under these circumstances, a certain amount of refraction will take place on the sides of the grooves forming the lines of data so that the scanning beam will be bent to one side or the other, and hence, more light will fall on one photomultiplier than will fall on the other. FIG. 9*b* depicts the condition when the scanning beam of light has moved to one side, and FIG. 9*c* depicts the condition when the scanning beam of light has moved to the opposite side of the track. Under either of these conditions, the difference amplifier will produce an output signal since one of the photomultipliers will have a greater amplitude output signal than the other, and the polarity of this output signal will indicate the direction that the scanning beam of light has moved off of the center line. This signal may then be applied through the linear gate 286 to summing amplifier 264 to correct for the condition to again center the scanning beam of light on the desired line of data as it is scanned across the track depicted by line 289 in FIG. 4. It might be pointed out that a somewhat similar action of signal generation occurs as the beam of light is scanned up the avenue along track 274 to produce the line count pulses supplied to the vertical line counter 247.

As the scanning beam of light from the flying spot scanner is caused to trace across the selected line of data from its initial starting position at the top of the trace 274 shown in FIG. 4, it will produce an output signal in the output of the summing amplifier 259 which is amplified by an A.-C. video amplifier 292 and supplied in parallel to two Schmitt trigger wave-shaping circuits 293 and 294. The Schmitt trigger wave-shaping circuit 293 is of conventional construction and is adjusted to respond only when the signal level of the output of the A.-C. video amplifier 292 drops substantially to zero as would be the case when the scanning beam of light crosses over a word-gap spacing 115 shown in FIG. 3, and all of the light falls on the opaque stop 231 best seen in FIGURE 6. As a consequence, the Schmitt trigger wave shaping circuit 293 operates to develop a word count signal pulse that is differentiated and supplied through a conductor 295 to an AND gate 296. The word clock signal pulses developed by the Schmitt trigger circuit 293 are also supplied to a ringing oscillator 297 of conventional construction which is tuned to the bit clock rate. A suitable circuit for this purpose is described in the referenced textbook by Millman and Taub on page 505. The ringing oscillator 297 develops a bit clock signal that is supplied through a Schmitt trigger wave shaping circuit 298 across conductor 299 back to the computer to serve as a bit clock shift pulse for synchronizing the data read out. The AND gate 296, which receives the differentiated word clock pulses from the Schmitt trigger circuit 293, has a second input connected to the output of a flip-flop 301. The set input terminal of flip-flop 301 is connected to the output of the preset vertical line counter circuit 247 and has the vertical line counter full signal pulse applied thereto for setting the flip-flop 301 to its ON condition. Accordingly, the AND gate 296 will be enabled by flip-flop 301, so that upon receiving the word clock pulses from Schmitt trigger 293, to supply these word clock pulses to the horizontal word counting circuit 248. The horizontal word counter 248 is of the preset counter type which is preset to a desired word address by the address supplied thereto from the computer. The horizontal word counter 248 upon reaching its preset count, resets itself to zero and puts out a word counter full signal pulse.

The word counter full signal pulse is supplied back to the flip-flop 301 to reset this flip-flop to its OFF condition, and is also supplied over the conductor 302 to a one-shot multivibrator 303. The one-shot multivibrator 303 is of conventional construction and serves to develop an output potential which lasts for a period of time related to the time required for the scanning beam of light to trace across one complete word of data. This output potential is supplied through an OR gate 304 whose output is connected to an AND gate 305. The AND gate 305 is connected to the output of the Schmitt trigger shaping circuit 294, which in turn is connected to the output of the summing amplifier 259 through A.-C. video amplifier 292. The wave shaping Schmitt trigger circuit 294 is set to respond to some median amplitude output signal from the A.-C. video amplifier 292. It should be noted that the summing amplifier 259, and hence A.-C. video amplifier 292, develops an output signal only when the scanning beam of light strikes a data record as at 116, 117 or 111 in FIGURE 3. This is due to the fact that only when the light beam is so oriented with respect to a data track, is sufficient light refracted away from the opaque stop 231 to fall upon the photomultipliers 229 as shown in FIGURE 6. The magnitude of the light falling on the photomultipliers 229, and hence the output of the amplifier 292, will vary depending upon which level 116 or 117 the light strikes in the data record member. For example, the Schmitt trigger 294 may be set to respond to the output amplitude of amplifier 292 at the level 116 of the data impression tracks in the thermoplastic film plate 113 shown in FIG. 3. The wave shaping circuit will then be triggered from one of its operating conditions to the other by the changes in amplitude of the signal supplied thereto from the A.-C. video amplifier 292 as the data track changes from level 116 to the second level 117. Accordingly, the output of the wave shaping circuit can be used to represent zeros and ones in the data being read out. This output signal developed by the wave shaping circuit is then supplied through the AND gate 305, which was enabled from the potential supplied thereto from the one-shot multivibrator 303, across a conductor 306 to the computer. As this output signal represents the data desired to be read out, the bit clock pulses supplied to the computer from the clock ringing oscillator 297 and Schmitt trigger circuit 298 may then be used to clock in the desired word for use by the computer.

After the scanning beam of light has completed tracing out all of the words in a line of data in which a selected word has been used by the computer, it is turned off by a reset signal pulse that is applied to the flip-flop 254 from a delay circuit 307. Delay circuit 307 is connected through a conductor 308 and conductor 281 back to the output of the preset vertical line counter 247. The vertical line counter full signal pulse put out by the counter then actuates the delay circuit 307. Delay circuit 307 has a delay for a period equal to the time required to scan across one line of data and then produces an output pulse which serves to reset the flip-flop 254. Upon flip-flop 254 being reset it removes the energizing potential supplied to the unblanking amplifier 272 so that the unblanking potential applied to the control grid of the flying spot scanner is removed thereby turning off the beam current. Concurrently, a reset signal pulse is supplied through a conductor 309 to the reset circuit for the vertical sweep generator circuit 273 to reset this circuit to its zero condition.

Should it be desired to read out an entire line of data selected by the vertical line selection counter and thereby eliminates selection of any particular word in the line through the use of the horizontal word counter, the vertical line counter full signal may be supplied through a conductor 281 and conductor 311 to a one-shot multivibrator 312. The one-shot multivibrator 312 is of conventional construction and serves to put out a signal potential having a time duration approximately equal to the time required for the scanning beam of light to scan across one line of data. This potential is applied as an enabling potential to one of the input circuits of AND gate 313. The AND gate 313 has a second enabling potential applied to the remaining input thereof from the complete line read-out output terminal of the computer 249, across the conductor 314. Accordingly, if the complete line read-out signal has been supplied to the logic circuits, the AND gate 313 will be enabled, when one-shot multivibrator 312 is fired by the line counter full signal pulse. AND gate 313 will then in turn open and supply the enabling potential from one-shot multivibrator 312 through OR gate 304 to AND gate 305. This results in opening AND gate 305 so that all the data appearing in a particular line as the scanning beam of light is caused to trace horizontally across the line from its initial starting position 274 shown in FIG. 4, is read out through the AND gate 305 and is supplied to computer in response to the command for the line of data.

*Detailed Description of Vertical Line Counter and Horizontal Word Counter*

Figure 10:
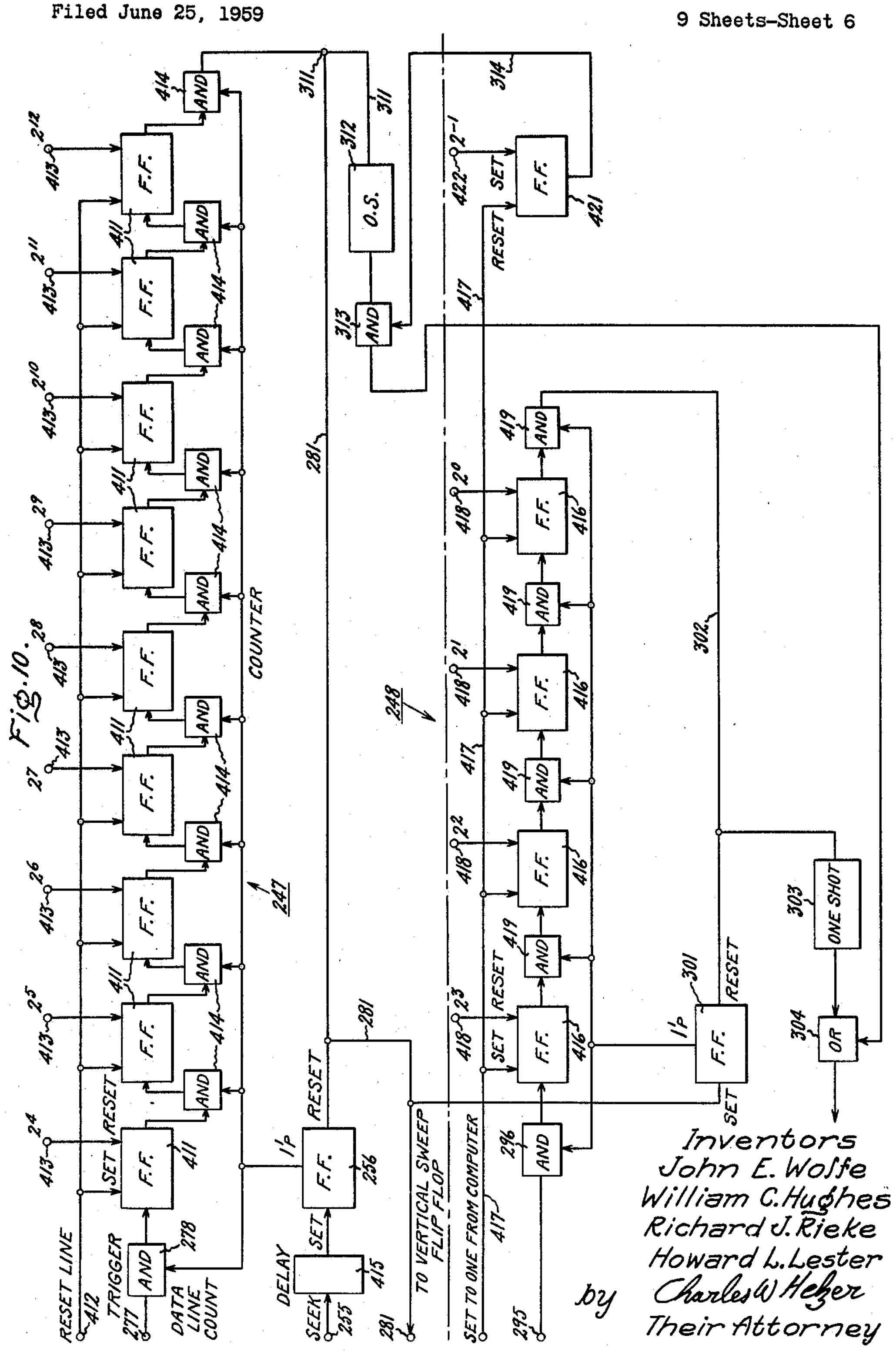
FIG. 10 is a functional block diagram of a vertical line preset counter and a horizontal word pre-set counter comprising a part of the read-out circuit arrangement shown in FIG. 8.

The details of construction of the vertical line preset counter 247 and the horizontal word preset binary counter 248 are illustrated in FIG. 10 of the drawings. The vertical line preset binary counter is made up of nine flip-flop amplifiers 411, whose set input terminals are connected in common to a line 412, which has a set to ON signal pulse supplied thereover from the computer. By this arrangement, the computer can set all of the flip-flops 411 to their ON condition prior to reading any particular address into the counter. The reset input terminals of each of the flip-flops 411 are connected through individual input terminals to the output register of the computer with which the logic circuits are to be used. Because each flip-flop amplifier 411 has two different operating conditions, and there are nine such flip-flops, it is possible to obtain 512 different conditions for the entire preset counter circuit, and, accordingly, there is one such condition for every one of the 512 lines in a sub-block of data. As a consequence, the address of any particular one of the 512 lines of sub-block data may be read into the preset counter formed by the flip-flops 411 by an appropriate coded address signal supplied to the terminals 413 of all the flip-flops in the counter. During this phase of the operation, however, it is desirable that the address applied to the first flip-flop in the counter not be shifted through the entire line of flip-flops. To prevent this, an AND gate 414 is connected between the output terminal of each flip-flop in the counter. When the AND gates 414 are not enabled, an address signal pulse supplied over the input terminal 413 of the first flip-flop 411 in the preset counter will not be shifted down through the entire string and, accordingly, all the flip-flops may be set individually in accordance with the address supplied thereto over its respective address input terminal 414. Assuming the preset counter 247 to be preset in the manner described above, and that subsequently a seek signal is supplied from the computer to the input terminal of flip-flop 256, the flip-flop 256, in going to its SET condition, will provide an enabling potential to all of the AND gates 414 in the preset counter, and, additionally, it will provide an enabling potential to the AND gate 278 connected to the input trigger circuit of the first flip-flop 411 in the preset counter. With the preset counter thus conditioned, upon the data line count pulses being supplied to the counter at the input terminal 277, these data line count pulses, which were produced as the scanning beam of line traces up an avenue over each line of data, will be applied to the trigger input terminal of the first flip-flop. If the first flip-flop is preset to its zero condition, then the first trigger pulse will trigger it to the ON condition, thus recording the first line count pulse. The second such line count pulse will then trigger the first flip-flop from its ON to its OFF condition and produce a trigger pulse at its output terminal which is connected through the AND gate 414 to the next flip-flop 411 in the line. This operation will be repeated for each successive line count pulse as it is supplied to the AND gate 278, and the preset counter will be counted down through the line of flip-flops 411 in a similar manner until the entire string of flip-flops have been set to their ON condition. The next data line count pulse occurring after setting all the flip-flops in the counter to their one-condition will then trigger the entire string of flip-flops to their zero condition and will produce a line counter full signal pulse which is supplied through the last AND gate 414 to the output terminal 281 where it is connected to the remainder of the reading system described in connection with FIG. 8.

The horizontal word count register 248 is, likewise, formed from a series of four flip-flop amplifiers 416, all of which have their set input terminals connected in common to a set-to-one line 417 that is connected to the computer supplying the address data to the word count register. The reset input terminals of each of the four flip-flops 416 are connected to a respective address input terminal 418 which, likewise, is connected to the computer for supplying a particular address input switching potential to the respective flip-flop. The inverse output terminal of each of the flip-flops 416 is connected through an AND gate 419 to the trigger input terminal of the next succeeding flip-flop 416 in the counter in a manner similar to the vertical line counter as described more fully in the chapter XI on binary counters in the above referenced Millman Taub textbook. Each of the AND gates 419 have one of their input terminals connected to the normal output terminal of the flip-flop 301, whose set input terminal is connected to the conductor 281 for supplying the vertical line counter full pulse to the flip-flop 301 and setting it to its Set or On condition. The flip-flop 301, in going to its Set condition, supplies an enabling potential to each of the AND gates 419. Prior to this occurrence, the computer has previously read in the address of the word to be obtained in any particular line in a manner similar to the vertical line selection counter described above. In doing this, the computer first supplies a Set to ONE signal pulse over the line 417 to the Set input terminals of all of the flip-flops 416. Since at this time the AND gates 419 have not been enabled, all of the flip-flops 416 will be set to their ON condition. Thereafter, the computer will supply an address switching potential to each of the flip-flops over their respective Reset input terminals 418 which will be in the nature of a zero or a one potential. If this switching potential represents a zero, flip-flops 416 will stay in the ON condition. However, if this switching potential is a one, since it is supplied to the Reset terminal of the flip-flop, the flip-flop will be reset to its OFF condition, thereby reading into the counter the address of the word to which the counter is to be preset. Having accomplished this, upon the flip-flop 301 being triggered to its SET condition by the line counter full signal pulse, the word counter is then in a SET condition to count down the desired word in any particular line. Concurrently, the AND gates 419 are enabled by the flip-flop 301, which also supplies an enabling potential to the input AND gate 296 whose output is connected to the trigger input terminal of the first flip-flop 416 in the preset counter. The remaining input terminal of the AND gate 296 has the word count signal pulses developed by the summing amplifier of the reading system applied to its input terminal 295. With the circuit thus conditioned, the word count pulses applied to the trigger input terminal of the first flip-flop 416 will cause all the flip-flops in the counter to be triggered to their Set condition in a manner similar to that described above with respect to the vertical line selection counter. After all of the flip-flops 416 have been triggered to their Set condition, upon the next word occurring, the word preset counter will be reset to its zero condition and will produce a word counter full signal pulse at the output of the last AND gate 419. This word counter full pulse is supplied over the conductor 302 to the reading circuits as described in connection with the reading system shown in FIG. 8 of the drawings, and is also applied as a resetting potential to the flip-flop 301 to reset this flip-flop to its OFF condition, thereby removing the enabling potentials from the AND gates 419 of the preset counter flip-flops 416 and conditioning the word counter for a new cycle of operation.

In addition to the vertical line preset counter and the word preset counter, an additional flip-flop 421 is provided which has its reset input terminal connected to the line 417 for setting this flip-flop to its OFF condition, simultaneously with the setting of the word preset counter to its ON condition prior to reading in the address of a desired word. Should it then be desired to read out an entire line of data, the computer will supply through the SET input terminal shown at 422 of the flip-flop 421 a coded signal which would be in the nature of a ONE potential which leaves this flip-flop in its ON condition. In the ON condition, the flip-flop 421 provides an enabling potential through the conductor 314 to the AND gate 313. The AND gate 313 also has a second enabling potential supplied to the remaining input terminal thereof from a one-shot multivibrator 312, which is triggered by the vertical counter full signal pulse applied thereto over the conductor 311. When conditioned by both the enabling potentials, and AND gate will, therefore, supply an enabling potential through the OR gate 304 of the reading system as described previously to read out an entire line of data after selection of the desired line by the vertical line counter.

*First Alternate Reading Arrangement*

Figure 11:
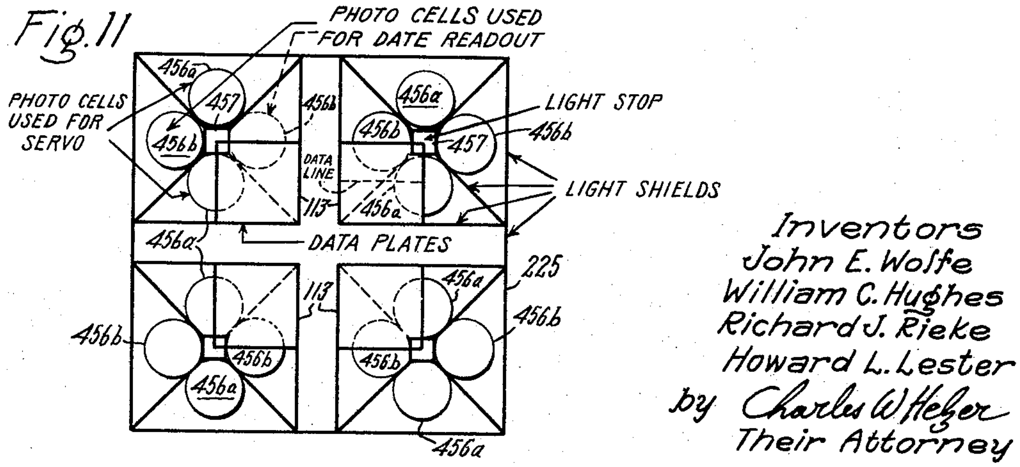
FIG. 11 illustrates an alternative arrangement of the read-out photoelectric devices comprising a part of the read-out arrangement of FIG. 6 and to be inserted in place of that portion of the FIG. 6 arrangement at the points indicated by the plane B—B.

An alternative photoelectric device read out arrangement to that shown in FIG. 6 of the drawings is illustrated in FIG. 11. It is anticipated that the alternative photomultiplier read out arrangement shown in FIG. 11 would be substituted for that portion of the readout arrangement of FIG. 6 from the point BB backwards to and including the field lens 224, the thermoplastic film data storage plates 113, and the light-tight housing 225 supported on the evacuated chamber walls 11 in a manner similar to that illustrated in FIG. 6. In FIG. 11 the field lenses 224 have been omitted for clarity. In the arrangement shown in FIG. 11, however, there are four photomultiplier devices 456 used to read out the data from each of the individual thermoplastic film data storage plates 113. Each set of four photocells 456 is arranged around an individual light stop 457, which corresponds to the light stop 231 in the arrangement of FIG. 6. However, one pair of photocells 456*a* is arranged tranversely with respect to the remaining pair of photocells 456*b*, and is also transverse with respect to the lines of data formed across the sub-blocks within the block of data 113, as illustrated in FIGS. 2, 3, and 4 of the drawings. The pair of photomultipliers 456*b* in each set extend parallel to the lines of data on the data storage plate.

The electrical connections to the photomultiplier read out arrangement of FIG. 11 are illustrated in FIG. 12 of the drawings, wherein the photomultipliers 456*b* are connected through a respective video gate 258 to a difference amplifier 261 and to a summing amplifier 259. The video gates 258 are selectively controlled by the block address register 244 to selectively connect one pair of photomultipliers 456*a* to the summing amplifier 259 and to the difference amplifier 261. These parts of the circuit correspond to the same elements in the reading system of FIG. 8 and function in a similar fashion. In addition, video gates 258 serve to connect the longitudinally arranged photomultipliers 456*b* to the second difference amplifier 458. In operation, the difference amplifier 261 functions in precisely the same manner as its corresponding element in the reading system of FIG. 8 to develop a vertical line count signal as well as a servoing signal to maintain the scanning beam of light produced by the flying spot scanner centered on a selected line of data. This difference signal is then supplied through the direct current amplifier 275 to the output terminal 453 directly, and through a Schmitt trigger wave shaping circuit 276 to an output terminal 452. The two output terminals 453 and 452 connect to similarly marked terminal points in the reading system of FIG. 8 to indicate where the alternative reading arrangement of FIG. 12 can be embodied into an overall reading system.

The summing amplifier 259, likewise, is constructed and operates similar to its corresponding element in the reading system of FIG. 8 to develop a video output signal that is supplied through a video A.C. amplifier 292, a Schmitt trigger circuit 293, and a wave shaping differentiating and clipping circuit to develop a word count output signal that is supplied to an output terminal 450. This word count output signal is also supplied to a bit rate ringing oscillator 297 and Schmitt trigger circuit 298 to a second output terminal 451. Additionally, the word count signal pulse is supplied over a conductor 459 to an OR gate 461 for a purpose to be described more fully hereinafter. The two output terminals 450 and 451 correspond to similarly marked terminal points on the reading system of FIG. 8, so that by connecting the alternate reading arrangement of FIG. 11 to these points, a complete reading system can be obtained.

With respect to the second difference amplifier 458, however, there is no corresponding element in the reading system of FIG. 8. As previously noted, the difference amplifier 458 is connected to the output of the pairs of photomultipliers **456*b* selectively by the video gate 258, and these photomultiplier pairs are arranged parallel to the data lines in the sub-data blocks of the thermoplastic film storage plates 113. The manner in which the pairs of photomultipliers 456*b* function to read out data from the data line on the thermoplastic film surface is somewhat different than the manner in which the summing amplifier arrangement of the FIG. 8 reading system functions and can best be explained in connection with the wave shapes shown in FIG. 13 of the drawings. The first curve under FIG. 13 is intended to depict the cross-sectional configuration of a data line similar to that illustrated in FIG. 3 of the drawings, and shows the area marking the avenue 111 followed by a word gap blank space 115, a data bit representing a ONE 117, followed by three ZERO data bits 116. Because the photomultiplier pairs 456*b* are arranged parallel to these changes in level or depth of the modulation groove defining the data line, these photomultipliers 456*b* are capable of detecting the slopes which accompany a change in level which indicate the changes in the bit information from a ONE to a ZERO and to a word gap spacing. This is in contrast to the FIG. 8 arrangement which detected the changes in overall amplitude of light passing through the thermoplastic film surface at the particular points in question. The following series of graphs A through F depict the nature of the electrical signal developed by the alternative reading arrangement of FIG. 12. However, prior to describing these signal wave shapes, it is preferred to describe the remainder of the circuit arrangement connected to the output of the difference amplifier 458**.

Difference amplifier 458 has its output connected to a direct current amplifier 462, whose output is connected to a paraphase amplifier 463 of the type described by the text book by Seeley, paragraph 10–7, on page 332. The paraphase amplifier 463 has its output connected in tandem to a first Schmitt trigger wave shaping circuit 464, and to a second Schmitt trigger wave shaping circuit 465. The Schmitt trigger circuit 464, in turn, has its output connected through the OR gates 461 previously mentioned to the RESET input terminal of a flip-flop 466. The Schmitt trigger wave shaping circuit 464 has its output terminal connected directly to the SET input terminal of the flip-flop 466. Flip-flop 466 has its output terminal connected through an AND gate 305, which corresponds to a similarly marked element of the reading system shown in FIG. 8, and provides a data output gate for the alternate reading arrangement of FIG. 12. The AND gate 305 has its remaining input terminal connected to a terminal point 454, and has its output connected to the terminal point 455. The two terminal points 454 and 455 correspond to similarly marked points in the reading system of FIG. 8.

The manner in which the alternate rearrangement of FIG. 12 functions to develop data output signals can best be understood by reference again to the series of wave shapes A through F shown in FIG. 13. FIG. 13A depicts the wave shape of the potential appearing at the output terminal of the Schmitt trigger circuit 464, and FIG. 13B depicts the wave shape of the potential appearing at the output terminal of the Schmitt trigger circuit 465. By comparison of the wave shapes of FIGS. 13A and 13B to the cross-section of the data line portrayed immediately above these two signal wave shapes, it can be determined that the Schmitt trigger 464 is adjusted to respond to positive going signal pulses which will be produced when the configuration of the data line goes from a lower level ONE to the higher level ZERO, and that the Schmitt trigger circuit 465 is adjusted to respond to negative going trigger pulses which will be produced when the configuration of the data lines goes from a higher level ZERO to a lower level ONE. While the two Schmitt trigger circuits 464 and 465 are incapable of distinguishing between a change from a ZERO or ONE level to a word gap space as opposed to a change from a ONE level to a ZERO level, this discrepancy does not cause difficulty in that it is obviated by requiring that the computer always write ONE as the first bit of information and by the signal developed by the summing amplifier 259, which also detects a change in level of the data line to the top surface, thereby indicating word gap spacing as at points 115. Accordingly, at these points a word count pulse will be produced as indicated in FIG. 13C, and this word count pulse is then used to trigger the ringing oscillator 297 which, in turn, develops a bit clock signal pulse illustrated in FIG. 13D of the drawings. This bit clock signal pulse is then supplied to the computer to clock in data bits supplied thereto from the output of the AND gate 305. FIG. 13E illustrates the word read out gate supplied to the AND gate 305 which enables that gate to read out data supplied thereto from the flip-flop 466, and is in the form of an elongated square wave signal potential that lasts for the duration of a word of data. From a comparison of the two wave shapes shown in FIG. 13C and FIG. 13E, it can be seen that the word count pulse supplied from summing amplifier 259 and the differentiating and clipping circuit through OR gate 461 will trigger flip-flop 466 to the ZERO or OFF condition prior to the opening of the AND gate 305 by the application through terminal 454 of the word read out gating potential shown in FIG. 13E. Thereafter, all changes in the condition of the flip-flop 466 will occur by reason of the changes in the output from the Schmitt trigger circuits 464 and 465 due to changes from a ZERO level as at 116, or changes from a ONE level as at 117, and will represent data bits. Accordingly, this information is the desired data, and will appear as at FIG. 13F in the output of the AND gate 305 for application to the computer. The alternate reading arrangement of FIG. 12 is believed to have a little better noise elimination quality than the reading system of FIG. 8, and, hence, in some applications may be desired. The alternate reading arrangement of FIG. 12, however, does require the two additional photomultipliers 456B not required by the reading arrangement of FIG. 8.

*Second Alternate Reading Arrangement*

Figure 16:
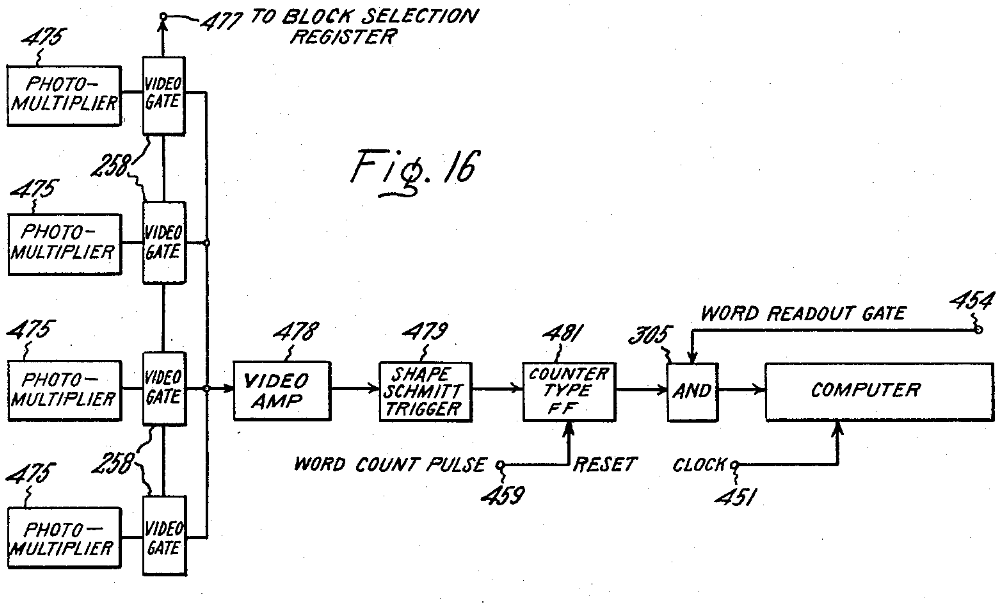
FIG. 16 is a functional block diagram of the electrical circuitry used with the read-out arrangement of FIG. 14 and FIG. 15.
Figure 14:
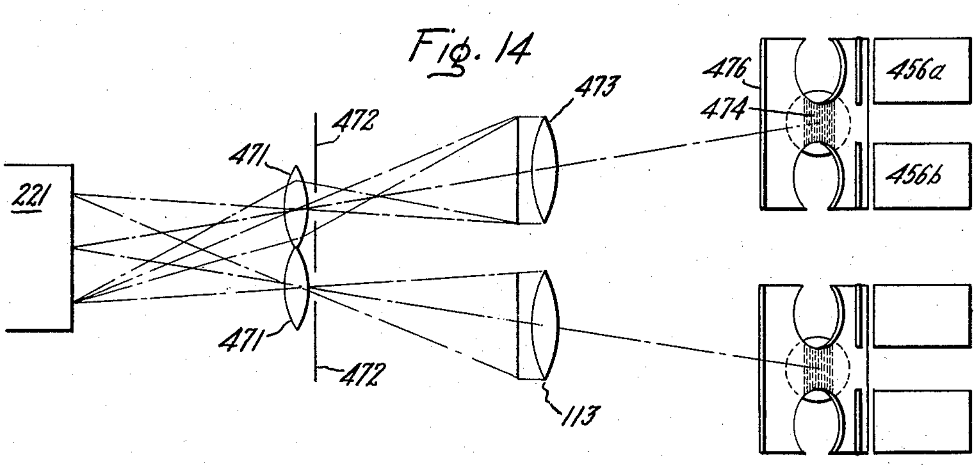
FIG. 14 is a side view of the physical form of still another read-out arrangement that can be used with the new and improved data storage device.
Figure 15:
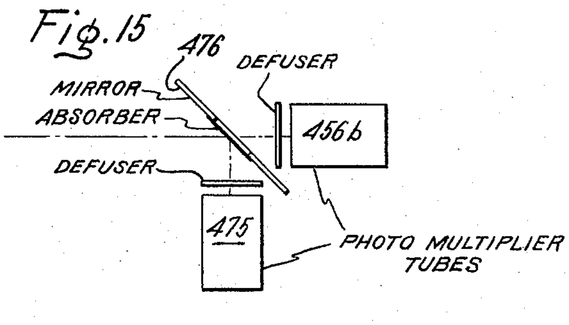
FIG. 15 is a side view of the photoelectric device pick-up portion of the read-out arrangement of FIG. 14 showing the same turned on its side with respect to the position shown in FIG. 14.

A second alternate reading arrangement for use with the reading system of FIG. 8 is illustrated in FIG. 14 of the drawings. The arrangement shown in FIG. 16 is in many respects similar to the alternate arrangement of FIG. 11 with the exception that it utilizes three photomultipliers in place of the four photomultipliers required by the reading system of FIG. 11. Hence, the arrangement of FIG. 14 reduces by one the number of photomultipliers required to read out data from each of the four thermoplastic film data storage plates 113. The optical arrangement used in connection with the reading system of FIG. 14 is somewhat different in that it requires a first set of process lenses 471 which serve to image the raster of the cathode ray tube face of the flying spot scanner 221 through an aperture in an aperture plate 472 onto the surface of the thermoplastic film data storage plate 113. A field lens 473 functions to image the light spot emanating from the back surface of the thermoplastic film storage plate onto an opaque absorbing surface 474 when there is no data written on the surface of the thermoplastic film data storage plate. The opaque absorbing surface 474 comprises a part of the photomultiplier read out arrangement which further includes a set of three photomultipliers 456*a*, 456*b*, and 475, as shown in FIG. 15 of the drawings. The two photomultipliers 456*a* and 456*b* in each set correspond to the pairs of photomultipliers 456*a* in the reading arrangement of FIG. 11 in that they are arranged transversely to the lines of data written in the sub-blocks on the surface of the thermoplastic film data storage plate 113. Where data is written on the storage plate 113, light will be projected from the field lens 473 upon the photomultipliers 456*a* and 456*b*. The photomultiplier 475 corresponds in function to the pair of photomultipliers 456*b* in the reading arrangement of FIG. 11. The single photomultiplier 475, however, requires a mirror 476 which is arranged at an angle of approximately 45 degrees with respect to the plane of the two photocells 456*a* and images light upon the photomultiplier 475. The mirror 476 and opaque absorbent material 474 are arranged in the same plane so that light imaged on the photomultiplier 475 by the mirror 476 in fact constitutes light refracted from the lines of data in a plane parallel to the data line in a manner similar to the pairs of photocells 456*b* in the arrangement of FIG. 11. Because the photomultiplier 475 then functions in precisely the same manner to develop an output electric signal representative of the changes in data level of the line of data on the thermoplastic film data storage plate, a further description of this operation is deemed unnecessary.

The electrical arrangement for deriving the data output signal from the four photomultipliers 475 of the reading arrangement of FIG. 14 is illustrated in FIG. 16. The photomultiplier 475 associated with the thermoplastic film data storage plate 113 being read out is selectively coupled through a video gate 258. The video gate 258 is controlled by the block selection address register of the reading system of FIG. 8, which is connected to the terminal point 477 and serves to open a selected one of the video gates 258 to connect the desired photomultiplier 475 to an output video amplifier 478. The video amplifier 478 is of conventional construction and has its output connected through a Schmitt trigger wave shaping circuit 479 to a flip-flop 481. The flip-flop 481 has its output terminal connected to an AND gate 305, which corresponds to a similar element of the reading system shown in FIG. 8. In addition to the signal supplied to flip-flop 481 from the Schmitt trigger wave shaping circuit 479, flip-flop 481 has a word count gating pulse supplied to its RESET input terminal from the terminal point 459 of the word count gating pulse developing circuit formed by the summing amplifier 259, and Schmitt trigger 293 of the reading system of FIG. 12. The AND gate 305, in addition to the output of the flip-flop 481, has applied to its remaining input terminal an enabling potential from the word read out gate from the terminal point 454 in the reading system of FIG. 8. By this arrangement, the word count gating pulse applied through terminal 459 to flip-flop 481 resets this flip-flop to the ZERO condition at the beginning of every word. Thereafter, flip-flop 481 is triggered from its OFF to its ON condition by the signal supplied thereto from the Schmitt trigger shaping circuit 479 in video amplifier 478. Since the two conditions of operation of the flip-flop 481 represent the zeros and ones in the data being read out by the photomultipliers 475, the signal appearing at the output of AND gate 305 represents the data being read out. In so far as its characteristics are concerned, the read out arrangement of FIG. 16 is believed to be equivalent to that of FIG. 11 and possesses the same advantages over the arrangement of FIG. 8 with the additional advantage of requiring one less photomultiplier than does the reading system of FIG. 12.

*Color Data Storage Device*

An alternative apparatus and method of recording binary data in two different color light gratings formed on the surface of the thermoplastic film data storage plates 113, is illustrated in FIG. 17 of the drawings. This apparatus includes an electron beam writing tube 153 which is identical in construction and operation to the electron beam writing tube 153 described in relation to the writing system shown in FIG. 5; and it is to be understood that the modifications shown in FIG. 17 are to be incorporated into the over-all writing system of FIG. 5 at the points to be noted hereinafter. The writing system of FIG. 17 includes a focus supply 155, a filament supply 156, and a high voltage supply 157 all connected to the electron beam writing tube 153 in a conventional manner. The tube 153 is supported within an evacuated container, not shown, since there is no end on the envelope of electron beam writing tube 153 in order that the electron beam produced thereby can pass out of the end of the envelope and hit the thermoplastic film data storage plate 113 at points directed by the deflection currents supplied to the horizontal and vertical deflection yokes. The shape of the electron beam where it hits the thermoplastic film storage plate 113, and the size of the beam spot is illustrated just above the thermoplastic film storage plate at 505. The beam spot is adjusted to be about .2 mil wide and about ¼ mil long. As the electron beam writing tube 153 is capable of producing beam spots having diameters of this order no difficulty will be encountered in writing a series of marks within the tolerance defined by the 1-mil spacing between the data bits to be written on the thermoplastic film data storage plate 113, in the manner to be described hereinafter. The electron writing beam produced by tube 153 is diverted in the vertical direction by the vertical deflection yoke which is driven by the vertical push-pull amplifier 203 and the summing amplifier 202, which correspond to similar elements of the writing system shown in FIG. 5. The input signals applied to the summing amplifier 202 are supplied from the terminal points 201 to 214, which correspond to similar terminal points marked with the same reference character in the writing system of FIG. 5. The horizontal deflection yoke of electron beam writing tube 153 is driven from the horizontal push-pull driver amplifier 174, having its input connected to summing amplifier 173, both of which amplifiers correspond to the similar elements in the writing system of FIG. 5. The horizontal address and horizontal sawtooth deflection potential are supplied to the summing amplifier 173 from the input terminals 211 and 172*a* which correspond to similarly marked terminal points in the writing system of FIG. 5.

Insofar as the construction and operation of the abovementioned elements are concerned, they function in precisely the same manner as the corresponding elements of the writing system of FIG. 5 to cause the electron writing beam of tube 153 to be addressed to a particular word on a particular line of a desired sub-block of data located on the face of the thermoplastic film storage plate 113. For the purpose of the present example, however, it will be assumed that in any particular sub-block of data being written, the electron beam is still located at the beginning of the avenue bordering the sub-data block, and that accordingly no horizontal sawtooth wave shape sweep potential has been applied to the input terminal 172*a* from the horizontal sawtooth sweep potential generator 172 of the writing system of FIG. 5.

In all of the above described respects, the writing arrangement shown in FIG. 17 operates in the same manner as the writing system of FIG. 5. The FIG. 17 arrangement differs, however, in that the data modulation signal is not applied to the modulation control grid of the writing tube 153 through the grid driver 158. Instead, however, only the blanking signal developed to provide the gaps between words in the data being recorded is applied to the modulation control grid of the writing tube from the grid driver 158 and input terminal 188*a* which corresponds to a similarly marked terminal point in the writing system of FIG. 5. By reason of this connection only a blanking signal pulse will be applied to the modulation control grid of the writing tube through the grid driver 158 whenever it is desired to have a word spacing gap appear in the data being recorded.

The data to be recorded is applied to the electron beam writing system 153 through a modulation circuit connected to a separate horizontal deflection yoke mounted on the electron beam writing tube 153. The data modulation current is developed in the same manner described with relation to the writing system of FIG. 5, and applied to the input terminals 501 and 502. The input terminals 501 and 502 correspond to similarly marked terminals at the output of the AND gates 161 and 162 in the writing system of FIG. 5. The signals applied to the input terminals 501 and 502 represent the ones and the zeros respectively in the data being supplied for the core shift register units of the writing system. These data input signals are applied to the Reset and Set input terminals of a flip-flop 506, whose normal and inverse output terminals are connected to a pair of video gates 507 and 508, respectively. The video gates 507 and 508 each constitutes a video switch of the type illustrated as Element 129 in the writing circuit of a "Thermoplastic Film Data Storage Equipment" disclosed in United States patent application 756,775, filed August 25, 1958, Glenn, Wolfe and Hughes, inventors, assigned to the General Electric Company, now abandoned, and refiled as U.S. continuation patent application Serial No. 263,442, filed March 7, 1963, Glenn, Wolfe and Hughes, inventors, and assigned to the General Electric Company.

Also coupled to the video gates 507 is a free running oscillator 509 which preferably has a signal frequency output up in the megacycle region, for example 4.5 megacycles, and the video gate 508 likewise has a free running crystal controlled oscillator 511 connected thereto which may have an output frequency, for example, of 3 megacycles. For the sake of convenience, it will be assumed that the 4.5 megacycles oscillator 509 will represent ones, and the 3 megacycle oscillator 511 will represent the zeros. The video gates 507, 508 will then function to connect either the oscillator 509 or the oscillator 511 through an output video gate 512, and modulation yoke current driver circuit 513 of conventional construction to an additional horizontal modulation deflection yoke of electron beam writing tube 153. The video gate 512 is similar in construction to the video gates 507 and 508, and has a switching potential applied thereto from the inverter 178 whose input is supplied with a blanking potential from an input terminal 503 connected to a correspondingly marked terminal on the writing system of FIG. 5. The video gate 512 when open will allow the high frequency modulation signal from either the oscillator 509 or oscillator 511, depending upon which is connected through its respective video gate the flip-flop 506, to pass through to the modulation yoke current driver 513 whenever it is open. The video gate 512 will be closed by an avenue timing signal potential applied to the inverter 178 from the input terminal 503, and this timing potential will correspond to the timing required for the electron beam to trace across an avenue 111 at the beginning of each line of data being recorded as shown in FIG. 18 of the drawings.

FIG. 18 of the drawings illustrates a series of signal potential waveforms that are produced in the read-out system used to read out data recorded on a thermoplastic film data storage plate 113 by the writing system of FIG. 19. A cross-sectional view of a thermoplastic film data storage plate 113 having data recorded thereon by the writing system of FIG. 19 is shown immediately over the first waveform plot. The track 111 is produced in the space occupied by the avenues bordering each sub-data block contiguous to each line of data bits recorded when the inverter 178 provides a blanking potential to the video gate 512 to close this gate and thereby prevent the application of the data modulating signals to the modulation yoke current driver 513. Upon termination of the avenue blanking signal from the inverter 178 a blanking pulse will be applied to the grid driver circuit 158 from the input terminal 188*a*, which corresponds to the gap 115 required at the beginning of the first word space. Thereafter, the electron beam of the writing tube 153 will be turned on and will be traced horizontally across the space in which the line is to be written by the horizontal sawtooth sweep generator supplied through input terminal 172*a* through summing amplifier 173 and the horizontal push-pull driver circuit 174 to the horizontal deflection yoke. Concurrently, the flip-flop 506 will switch the video gates 507 and 508 on and off alternately as zeros and ones appear in the data to be written, thereby effectively connecting the ones oscillator 509, or the zeros oscillator 511, to the additional modulation yoke of the electron beam writing tube 153. This action results in sweeping the electron writing beam, which has about five hundredths of a mil diameter, in the horizontal direction, at the sweep frequency rate over the one mil space in which the zero or the one is to be written. The resulting track is shown at 515 and 516 in a cross-sectional view of FIG. 18 where the closer spaced depressions 515 are produced by the higher frequency oscillator 509 and represents the ones in the data being written, and the wider spaced depressions 516 are produced by the lower frequency oscillator 511 and represents the zeros in the data being written. Accordingly, it can be appreciated that the writing circuit of FIG. 19 results in writing two separate gratings to record the binary bits of information. These gratings have different grating spacings and can be used to diffract a light beam to produce two different color light output beams, one color representing the zeros and the other color representing the ones in the data recorded on the thermoplastic film plate. In all other respects, the writing system of FIG. 19 will correspond to the writing system described in relation to FIG. 5 of the drawing and can be incorporated thereinto by connection to the terminal points as indicated in the above description.

A reading system used to read out data recorded in the manner shown in FIG. 18 of the drawings is identical in construction and operation to the reading system shown in FIGS. 11 and 12 of the drawings with the one exception of the manner in which the read out photomultipliers 456*a* and 456*b* associated with each of the thermoplastic film data storage plates 113 are supported with relation to the scanning read out beam of the flying spot scanner 221. FIG. 19 of the drawings illustrates the manner in which the read out photomultipliers are mounted for use in reading out the grating recordings shown in FIG. 18. The primary difference in construction of the read photomultiplier arrangement lies in the inclusion of a mask 521 having a pair of apertures 522 and 523 therein, which are disposed over the two horizontally arranged photomultipliers **456*b* in each set. These masks effectively blank most of the area of the photomultipliers 456*b* with the exception of the light that is allowed in through the apertures 522 and 523. The two apertures 522 and 523 in the mask are spaced apart different distances from a center line passing between the two photomultipliers 456*b*, which distance is determined by the spacing of the first order light rays diffracted from the two different color light diffraction gratings 515 and 516 formed on the surface of the thermoplastic film 113 which represent the ones and the zeros in the data recorded, respectively. The manner in which the two different gratings 515 and 516 in the recorded data diffract different colored light when illuminated by the read out beam of the flying spot scanner tube 221, is explained more fully in the above-identified co-pending application of Glenn, Wolfe and Hughes and reference is made thereto for a further explanation of the phenonema. It is believed sufficient for the present explanation to point out that the light passing through the aperture 522 and hitting the photomultiplier 456*b* in back of this aperture will represent the zero bits of information, and the light passing through the aperture 523** will represent the ones bits of information so that the output electric signals from the two photomultipliers in back of these two apertures will represent the ones and the zeros in the data recorded on the thermoplastic film, respectively. This data output signal may then be used in the manner described in relation to the reading systems of FIGS. 11 and 12 for application to the computer requiring the information recorded in the data. The wave shape of the output potentials obtained from the reading system of FIGS. 11 and 12 where used to read out data recorded in the above manner, are shown in FIG. 19.

From the foregoing description it can be appreciated that the invention provides a new and improved quick access data storage device which utilizes a thermoplastic solid impressionable medium upon which intelligence conveying marks are formed by electron beam writing. The thermoplastic solid impressionable medium with the marks formed thereon is disposed within the view of a rapid scanning light beam source, such as a flying spot scanner tube, that is capable of rapidly scanning a beam of light across the entire width and height of the impressionable medium to illuminate any desired light modifying marks upon the medium. Data written on the impressionable medium is read out by photoelectric means positioned to view the thermoplastic impressionable medium and to have light emanating from illuminated portions of the medium fall on the photoelectric means for deriving an output electric signal representative of the intelligence. As a consequence, a quick access, high density data storage device which is highly reliable in operation is made available by the invention. In one embodiment of the invention, a quick access data storage device having the above characteristics is made available, which further includes an excellent signal to noise ratio characteristic in that it uses light optical gratings of two different colors to store data in binary form.

Having described several embodiments of a quick access, high density data storage device constructed in accordance with the invention, it is believed obvious that many modifications and variations of the present invention are possible in the light of the above teachings. It is, therefore, to be understood that changes may be made in the particular embodiments of the invention described which are within the full intended scope of the invention as defined by the appended claims.

What we claim as new and desire to secure by Letters Patent of the United States is:

1. A rapid access data storage device adapted to read out a solid impressionable medium having lines of intelligence conveying light modifying marks formed thereon by electron writing and subsequent curing whereby the electrons form permanent depressions in the medium, said data storage device comprising a rapid scanning light source for producing a scanning point source of light, said scanning point source of light being capable of rapidly scanning across the width and height of the medium to illuminate any desired light modifying mark, photoelectric means comprising at least two photoelectric devices positioned to view opposite sides of the lines of light modifying marks on said medium and to have light emanating from illuminated portions of said lines fall thereon, means for summing the outputs from said photoelectric devices for deriving an output electric signal representative of the intelligence in said marks, and means for deriving a servo signal from the output of said photoelectric devices that is coupled back to said rapid scanning light source for causing said scanning beam of light to track along a desired line of data.

2. The combination set forth in claim 1 wherein the rapid scanning light source comprises a flying spot scanner having a wide angle of deflection in both the horizontal and vertical directions and wherein the photoelectric devices comprise at least a pair of photomultiplier tubes positioned to view opposite sides of the lines of light modifying marks in the medium.

3. The combination set forth in claim 1 further characterized by an electron beam writing apparatus for impressing electrons on said solid impressionable medium in desired patterns, heating means for heating said medium to cause said patterns of electrons to set and form permanent intelligence conveying light modifying marks in the form of depressions in the medium, transfer means for transferring said medium between said electron beam writing apparatus and said reading position where it is viewed by said scanning light source and said photoelectric means, and an evacuated housing surrounding said medium in its reading position, said transfer means, and said electron beam writing apparatus.

4. A rapid access high density data storage device comprising a recording medium of solid impressionable thermoplastic film having lines of intelligence conveying light modifying marks formed thereon by electron writing and subsequent curing to form permanent depressions in the medium, a rapid scanning light source comprising a flying spot scanner having a wide angle of deflection in both the horizontal and vertical directions and capable of producing a rapidly scanning point source of light across the width and height of the medium to illuminate any desired light modifying marks, addressing means operatively coupled to said flying spot scanner for causing said scanning beam of light to quickly address to a desired point on the thermoplastic medium, and photoelectric means comprising at least two photoelectric devices positioned to view opposite sides of the lines of light modifying marks on the medium and having the light emanating from illuminated portions of said thermoplastic medium fall thereon, means for summing the outputs from the photoelectric devices for deriving an output electric signal representative of the intelligence in said marks, and means for deriving a servo signal from the output of said photoelectric devices that is coupled back to said flying spot scanner for causing said scanning beam of light to track along a desired line of data.

5. The combination set forth in claim 4 wherein said address means comprises an address register, an analog converter operatively coupled to said address register for converting the address supplied thereto to an electrical analog signal, and vertical and horizontal deflection circuits coupled to said analog converter and to said flying spot scanner for causing the light beam to be scanned to a desired position in response to the electrical analog signal supplied thereto by said converter.

6. The combination set forth in claim 4 further characterized by an electron beam writing apparatus for impressing electrons on said solid impressionable medium in desired patterns, heating means for heating said medium to cause said patterns of electrons to set and form permanent intelligence conveying light modifying marks in the form of depressions in the medium, transfer means for transferring said medium between said electron beam writing apparatus and said reading position where it is viewed by said scanning light source and said photoelectric means, and an evacuated housing surrounding said medium in its reading position, said transfer means, and said electron beam writing apparatus.

7. A rapid access high density data storage device comprising a plate of solid impressionable thermoplastic film having data bearing light modifying marks formed thereon by electron writing and subsequent curing to form permanent depressions in the medium, said marks being formed on said plate in a rectangular array of rectangular sub-blocks which define relatively wide intersecting avenues and streets to provide quick access to the data contained in any one selected sub-block, and with the data in any of the sub-blocks being arranged in lines in the order of one mil apart with the data in each line being formed in words spaced in the order of one mil apart and each word being formed from bits of information likewise spaced in the order of one mil apart, a rapid scanning light source comprising a flying spot scanner having a wide angle of deflection in both the horizontal and vertical directions and capable of rapidly indexing a beam of light to one of the intersections of a street and avenue defining a desired sub-block of data, addressing means operatively coupled to said flying spot scanner for causing said scanning beam of light to quickly address to one of the intersections of an avenue and street bordering a desired sub-block of data, and photoelectric means comprising at least two photoelectric devices positioned to view opposite sides of the lines of light modifying marks and to have light emanating from illuminated portions of said thermoplastic plate fall thereon for deriving an output electric signal representative of the data contained in said marks and for use in deriving a servo signal that is coupled back to said flying spot scanner for causing said scanning beam of light to track along a desired line of data to be read out.

8. The combination set forth in claim 7 wherein said addressing means comprise horizontal and vertical deflection circuits coupled to said flying spot scanner, a coarse vertical address register and an analog converter coupled between said vertical address register and the vertical deflection circuit, a coarse horizontal address register and an analog converter coupled between said horizontal address register and the horizontal deflection circuit, said coarse vertical and horizontal deflection circuits serving to quickly address the scanning beam of light to one of the intersections of an avenue and street bordering a desired sub-block of data, means for developing a fine vertical deflection voltage coupled to said vertical deflection circuit for causing said beam of light to trace vertically along the lines of a selected sub-block of data to a desired line, and means for developing a fine horizontal deflection voltage coupled to said horizontal deflection circuit to cause the beam of light to trace along a selected line of a sub-block of data to a desired word.

9. The combination set forth in claim 7 further characterized by an electron beam writing apparatus for impressing electrons on said solid impressionable medium in desired patterns, heating means for heating said medium to cause said patterns of electrons to set and form permanent intelligence conveying light modifying marks, transfer means for transferring said medium between said electron beam writing apparatus and said reading position where it is viewed by said scanning light source and said photoelectric means, and an evacuated housing surrounding said medium in its reading position, said transfer means, and said electron beam writing apparatus.

10. The combination set forth in claim 8 wherein said addressing means comprises horizontal and vertical deflection circuits coupled to said flying spot scanner, a coarse vertical address register and an analog converter coupled between said vertical address register and the vertical deflection circuits, a coarse horizontal address register and an analog converter coupled between said horizontal address register and the horizontal deflection circuit, said coarse vertical and horizontal deflection circuits serving to quickly address the scanning beam of light to one of the intersections of an avenue and street bordering a desired sub-block of data, means for developing a fine vertical deflection voltage coupled to said vertical deflection circuit for causing said beam of light to trace vertically along the lines of a selected sub-block of data to a desired line, means for developing a fine horizontal deflection voltage coupled to said horizontal deflection circuit to cause the beam of light to trace along a selected line of a sub-block of data to a desired word, and servo circuit means operatively coupled to the vertical deflection circuit for maintaining the scanning beam of light centered on a desired line of data as the beam is caused no trace along the desired line.

11. The combination set forth in claim 7 wherein said addressing means comprises horizontal and vertical deflection circuits coupled to said flying spot scanner, a coarse vertical address register and analog converter coupled between said vertical address register and the vertical deflection circuits, a coarse horizontal address register and analog converter coupled between said horizontal address register and the horizontal deflection circuit, said coarse vertical and horizontal deflection circuits serving to quickly address the scanning beam of light to one of the intersections of an avenue and street bordering a desired sub-block of data, circuit means including a difference amplifier coupled to said photoelectric means, a line address register controlling a vertical line counting circuit coupled to said difference amplifier and a vertical sawtooth sweep potential generator coupled to said vertical deflection circuit and inhibited by said vertical line counting circuit for causing said beam of light to trace along the lines of a selected sub-block of data to a desired line and then stopping, circuit means including a summing amplifier coupled to said photoelectric means, a word address register, a word counting circuit coupled to said word address register and said summing amplifier and a horizontal sawtooth sweep potential generator coupled to horizontal deflection circuit and controlled by said vertical line counting circuit to cause the beam of light to trace along a selected line of a sub-block of data to a desired word upon the scanning beam of light reaching a desired line of data, a data output gate coupled to said photoelectric means and controlled by said word counting circuit for gating out data being read out from said thermoplastic plate upon said word counting circuit being filled, and second summing circuit means coupling the output of said difference amplifier to said vertical deflection circuit for maintaining the scanning beam of light centered on a desired line of data as the beam is caused to trace along the line.

12. A rapid access high density data storage device including in combination a plurality of plates of solid impressionable thermoplastic film each having data bearing light modifying marks formed thereon, said marks being formed on each of said plates in a rectangular array of rectangular sub-blocks which define relatively wide intersecting avenues and streets to provide quick access to the data contained in any one selected sub-block, and with the data in each of the sub-blocks being arranged in lines in the order of one mil apart with the data in each line being formed in words spaced in the order of one mil apart and each word being formed from bits of information likewise spaced in the order of one mil apart, a rapid scanning light source comprising a flying spot scanner having a wide angle of deflection in two transverse directions positioned to view the plurality of plates and capable of rapidly indexing a beam of light to a selected one of the plates to the intersection of a street and avenue bordering a desired sub-block of data, a respective pair of photomultiplier devices positioned to view each of said plates of thermoplastic film, address means including a first address register for selecting one set of two photomultipliers adjacent a desired plate of thermoplastic film, switching means controlled by said first address register for switching the selected set of photomultipliers to a difference amplifier and a summing amplifier output circuit respectively, said addressing means further including horizontal and vertical deflection circuits coupled to said flying spot scanner, a coarse vertical address register and analog converter coupled between said vertical address register and the vertical deflection circuits, a coarse horizontal address register and analog converter coupled between said horizontal address register and the horizontal deflection circuit, said coarse vertical and horizontal deflection circuits serving to quickly address the scanning beam of light to one of the intersections of an avenue and street bordering a desired sub-block of data, circuit means including said difference amplifier, a line address register, a vertical line counting circuit controlled by said line address register and coupled to said difference amplifier and to a vertical sawtooth sweep potential generator, said vertical sweep generator being coupled to said vertical deflection circuit for causing said beam of light to trace across the lines of a selected sub-block of data to a desired line and then stopping, circuit means including said summing amplifier, a word address register, a word counting circuit coupled to said word address register and to said summing amplifier, and a horizontal sawtooth sweep potential generator coupled to and controlled by said vertical line counting circuit to cause the beam of light to trace along a selected line of a sub-block of data to a desired word upon the scanning beam of light reaching a desired line of data, a data output gate coupled to said photoelectric means and controlled by said word counting circuit for gating out data being read out from said thermoplastic plate upon said word counting circuit being filled, and second summing circuit means coupling the output of said difference amplifier to said vertical deflection circuit for maintaining the scanning beam of light centered on a desired line of data as the beam is caused to trace along the line.

13. The combination set forth in claim 12 further characterized by an electron beam writing apparatus for impressing electrons on said solid impressionable medium in desired patterns, heating means for heating said medium to cause said patterns of electrons to set and form permanent intelligence conveying light modifying marks, transfer means for transferring said medium between said electron beam writing apparatus and said reading position where it is viewed by said scanning light source and said photoelectric means, and an evacuated housing surrounding said medium in its reading position, said transfer means, and said electron beam writing apparatus.

14. A rapid access high density data storage device including in combination a plurality of plates of solid impressionable thermoplastic film each having data bearing light modifying marks formed thereon, said marks being formed on each of said plates in a rectangular array of rectangular sub-blocks which define relatively wide intersecting avenues and streets to provide quick access to the data contained in any one selected sub-block, and with the data in each of the sub-blocks being arranged in lines in the order of one mil apart with the data in each line being formed in words spaced in the order of one mil apart and each word being formed from bits of information likewise spaced in the order of one mil apart, a rapid scanning light source comprising a flying spot scanner having a wide angle of deflection in two transverse directions positioned to view the plurality of plates and capable of rapidly indexing a beam of light to a selected one of the plates to the intersection of a street and avenue bordering a desired sub-block of data, a respective set of photomultiplier devices positioned to view each of said plurality of plates of thermoplastic film, one pair of photomultipliers in each set being arranged transverse to the remaining pair of photomultipliers and to the lines of data in the sub-block, means including a first address register for selecting one set of photomultipliers adjacent a desired plate of thermoplastic film, switching means controlled by said first address register for switching the selected set of photomultipliers to two difference amplifiers and to a summing amplifier respectively, the first difference amplifier being coupled to the pair of photomultipliers arranged transversely to the lines of data, said addressing means further including horizontal and vertical deflection circuits coupled to said flying spot scanner, a coarse vertical address register and analog converter coupled between said vertical address register and the vertical deflection circuits, a coarse horizontal address register and analog converter coupled between said horizontal address register and the horizontal deflection circuit, said coarse vertical and horizontal deflection circuits serving to quickly address the scanning beam of light to one of the intersections of an avenue and street bordering a desired sub-block of data, circuit means including said first difference amplifiers, a line address register, a vertical line counting circuit controlled by said line address register and coupled to said first difference amplifier and to a vertical sawtooth sweep potential generator, said vertical sweep generator being coupled to said vertical deflection circuit for causing said beam of light to trace across the lines of a selected sub-block of data to a desired line and then stop, circuit means including said summing amplifier, a word address register, a word counting circuit coupled to said word address register and said summing amplifier, and a horizontal sawtooth sweep potential generator coupled to and controlled by said vertical line counting circuit to cause the beam of light to trace along a selected line of a sub-block of data to a desired word upon the scanning beam of light reaching a desired line of data, a data output gate coupled to the output of said remaining difference amplifier and controlled by said word counting circuit for gating out data being read out from said thermoplastic plate upon said word counting circuit being filled, and second summing circuit means coupling the output of said first difference amplifier to said vertical deflection circuit for maintaining the scanning beam of light centered on a desired line of data as the beam is caused to trace along the line.

15. The combination set forth in claim 14 wherein each set of photomultipliers have apertured masks covering the remaining pairs of photomultipliers in each set which are arranged parallel to the lines of data being read out, the masks covering each individual photomultiplier of said pairs having apertures therein which are spaced unequal distances with respect to each other from a center line passing between the photomultipliers as determined by the spacing of the first order light rays of a color light characteristic to the respective photomultiplier, corresponding photomultipliers in all the sets being responsive to the same color light.

16. A rapid access high density data storage device including in combination a plurality of plates of solid impressionable thermoplastic film each having data bearing light modifying marks formed thereon, said marks being formed on each of said plates in a rectangular array of rectangular sub-blocks which define relatively wide intersecting avenues and streets to provide quick access to the data contained in any one selected sub-block, and with the data in each of the sub-blocks being arranged in lines in the order of one mil apart with the data in each line being formed in words spaced in the order of one mil apart and each word being formed from bits of information likewise spaced in the order of one mil apart, a rapid scanning light source comprising a flying spot scanner having a wide angle of deflection in two transverse directions positioned to view the plurality of plates and capable of rapidly indexing a beam of light to a selected one of the plates to the intersection of a street and avenue bordering a desired sub-block of data, a respective set of three photomultiplier devices positioned to view each of said plates of thermoplastic film, a pair of photomultipliers in each set being arranged transverse to the lines of data on the sub-blocks with the third photomultiplier arranged to view the lines of data by means of a mirror positioned to reflect light emanating from the lines of data onto said third photomultiplier, including a first address register for selecting one set of three photomultipliers adjacent a desired plate of thermoplastic film, switching means controlled by said first address register for switching the selected set of photomultipliers to a difference amplifier, a summing amplifier, and a video amplifier output circuit, respectively, the difference amplifier being coupled to the pair of photomultipliers arranged transversely to the lines of the data, said addressing means further including horizontal and vertical deflection circuits coupled to said flying spot scanner, a coarse vertical address register and analog converter coupled between said vertical address register and the vertical deflection circuits, a coarse horizontal address register and analog converter coupled between said horizontal address register and the horizontal deflection circuit, said coarse vertical and horizontal deflection circuits serving to quickly address the scanning beam of light to one of the intersections of an avenue and street bordering a desired sub-block of data, circuit means including said difference amplifier, a line address register, a vertical line counting circuit controlled by said line address register and coupled to said difference amplifier and to a vertical saw-tooth sweep potential generator, said vertical sweep generator being coupled to said vertical deflection circuit for causing said beam of light to trace across the lines of a selected sub-block of data to a desired line and then stopping, circuit means including amplifier, a word address register, a word counting circuit coupled to said word address register and said summing amplifier, and a horizontal saw-tooth sweep potential generator coupled to and controlled by said vertical line counting circuit to cause the beam of light to trace along a selected line of a sub-block of data to a desired word upon the scanning beam of light reaching a desired line of data, a data output gate coupled to said third photomultiplier device through said video amplifier and controlled by said word counting circuit for gating out data being read out from said thermoplastic plate, and second summing circuit means coupling the output of said difference amplifier to said vertical deflection circuit for maintaining the scanning beam of light centered on a desired line of data as the beam is caused to trace along the line.

17. A rapid access data storage device comprising a solid impressionable medium having radiant energy modifying depressions formed therein by electron writing, a block of lines of data with each line comprising a plurality of bits of data, a rapid scanning radiation source for producing a scanning beam of radiant energy capable of rapidly scanning across the width and heighth of the medium to illuminate any desired data bit, first deflecting means coupled to said scanning radiation source to cause the scanning beam of radiant energy to trace up the block of lines to a desired line of data, second deflecting means coupled to said scanning source of radiant energy to cause the beam of radiant energy to scan across a chosen line of data to a desired data bit, and servoing means including a pair of differential connected radiant energy sensitive devices positioned to view opposite sides of the lines of data and operatively coupled to said second deflecting means, said radiant energy sensitive devices having radiant energy from said scanning beam of radiant energy impinge thereon as it scans across a chosen line of data for deriving a servo signal that is supplied to said second deflecting means maintaining the scanning beam of radiant energy centered on the chosen line of data.

18. The combination set forth in claim 17 further characterized by counting means including said radiant energy sensitive devices operatively coupled to the first deflecting means and to a counting device for counting the lines of data as the scanning beam of radiant energy is caused to trace up the block of lines to a desired line to cause the beam to stop at the desired line.

19. The combination set forth in claim 17 further characterized by a counting device operatively coupled to the radiant energy sensitive devices in the servoing means for counting across bits of data in a line as the scanning beam of radiant energy is caused to scan across a line of data.

20. The combination set forth in claim 17 further characterized by a counting device operatively coupled to the radiant energy sensitive devices in the servoing means for counting across bits of data in a line as the scanning beam of radiant energy is caused to scan across a line of data, and further characterized by counting means including the radiant energy sensitive devices operatively coupled to the first deflecting means and to a counting device for counting the lines of data as the scanning beam of radiant energy is caused to trace up the block of lines to a desired line to cause the beam to stop at the desired line.

21. A rapid access data storage device comprising a solid impressionable medium having light modifying data gratings formed therein by electron writing, said gratings being formed in a block of lines of gratings with each line of gratings being formed from gratings having two different and distinct grating spacings whereby light having two different color characteristics will be diffracted therethrough, a rapid scanning light source for producing a scanning beam of light capable of rapidly scanning across the width and heighth of the medium to illuminate any desired data grating, first deflecting means coupled to said scanning light source to cause the scanning beam of light to trace up the block of lines to a desired line of data gratings, second deflecting means coupled to said scanning light source to cause the beam of light to scan across a chosen line of data to a desired data grating, and servoing means including a pair of differential connected photoelectric devices positioned transverse to the line of data gratings and operatively coupled to the first deflecting means for maintaining the scanning beam of light centered on a chosen line of data, and a second set of photoelectric devices positioned to have light from the scanning light beam and emanating from the diffraction gratings impinge thereon, and color filtering means disposed intermediate the second set of photoelectric devices and the impressionable medium for allowing only light of a selected color to impinge on the second photoelectric devices.

22. The combination set forth in claim 21 further characterized by counting means including a photoelectric device operatively coupled to the first deflecting means and to a counting device for counting the lines of data as the scanning beam of light is caused to trace up the block of lines to a desired line to cause the light beam to stop at the desired line.

23. The combination set forth in claim 21 further characterized by a counting device operatively coupled to the photoelectric device in the servoing means for counting data gratings in a line as the scanning light beam is caused to scan across a line of data.

24. The combination set forth in claim 21 further characterized by a counting device operatively coupled to the photoelectric devices in the servoing means for counting across bits of data in a line as the scanning light beam is caused to scan across a line of data, and further characterized by counting means including a photoelectric device operatively coupled to the first deflecting means and to a counting device for counting the lines of data as the scanning beam of light is caused to trace up the block of lines to a desired line to cause the light beam to stop at the desired line.

References Cited in the file of this patent

UNITED STATES PATENTS

| | | |
|---|---|---|
| 2,707,162 | Fries | Apr. 26, 1955 |
| 2,776,339 | Arni | Jan. 1, 1957 |
| 2,830,285 | Davis et al. | Apr. 8, 1958 |
| 2,885,539 | Hoover | Oct. 7, 1958 |
| 2,922,987 | Haugk | Jan. 26, 1960 |
| 2,985,866 | Norton | May 23, 1961 |

FOREIGN PATENTS

| | | |
|---|---|---|
| 806,274 | Great Britain | Dec. 23, 1958 |